US011530318B2

(12) United States Patent
Tsuda

(10) Patent No.: US 11,530,318 B2
(45) Date of Patent: Dec. 20, 2022

(54) RUBBER COMPOSITION AND PNEUMATIC TIRE

(71) Applicant: BRIDGESTONE CORPORATION, Tokyo (JP)

(72) Inventor: Shunsuke Tsuda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 303 days.

(21) Appl. No.: 16/896,430

(22) Filed: Jun. 9, 2020

(65) Prior Publication Data

US 2020/0299489 A1 Sep. 24, 2020

Related U.S. Application Data

(63) Continuation of application No. PCT/JP2018/041856, filed on Nov. 12, 2018.

(30) Foreign Application Priority Data

Dec. 15, 2017 (JP) ............................. JP2017-240805

(51) Int. Cl.
| | | |
|---|---|---|
| C08L 7/00 | (2006.01) | |
| C08K 3/013 | (2018.01) | |
| B60C 1/00 | (2006.01) | |
| C08F 136/06 | (2006.01) | |
| C08F 212/08 | (2006.01) | |
| C08F 236/06 | (2006.01) | |
| C08K 5/17 | (2006.01) | |
| C08K 5/20 | (2006.01) | |
| C08L 23/08 | (2006.01) | |
| C08L 29/04 | (2006.01) | |
| C08L 53/02 | (2006.01) | |

(52) U.S. Cl.
CPC .............. *C08L 7/00* (2013.01); *B60C 1/0016* (2013.01); *C08F 136/06* (2013.01); *C08F 212/08* (2013.01); *C08F 236/06* (2013.01); *C08K 3/013* (2018.01); *C08K 5/17* (2013.01); *C08K 5/20* (2013.01); *C08L 23/08* (2013.01); *C08L 29/04* (2013.01); *C08L 53/025* (2013.01); *B60C 2200/04* (2013.01); *C08K 2201/004* (2013.01); *C08L 2205/16* (2013.01)

(58) Field of Classification Search
None
See application file for complete search history.

(56) References Cited

U.S. PATENT DOCUMENTS

| | | | | |
|---|---|---|---|---|
| 3,615,972 A | * | 10/1971 | Morehouse, Jr. | .......... C08J 9/32 |
| | | | | 523/210 |
| 6,497,261 B1 | * | 12/2002 | Fukushima | ............. B60C 11/14 |
| | | | | 152/209.7 |
| 2018/0355155 A1 | | 12/2018 | Nukaga | |

FOREIGN PATENT DOCUMENTS

| | | |
|---|---|---|
| CN | 101160353 A | 4/2008 |
| EP | 1 854 839 A1 | 11/2007 |
| EP | 2 060 604 A1 | 5/2009 |
| EP | 2 674 455 A1 | 12/2013 |
| EP | 2 676 994 A1 | 12/2013 |
| JP | 09-194640 A | 7/1997 |
| JP | 2009-203288 A | 9/2009 |
| JP | 2011-89066 A | 5/2011 |
| JP | 2011-094013 A | 5/2011 |
| JP | 5193623 B2 | 5/2013 |
| JP | 2013-249423 A | 12/2013 |
| JP | 5436203 B2 | 3/2014 |
| JP | 2014-231575 A | 12/2014 |
| JP | 2016-047885 A | 4/2016 |
| JP | 2017-137436 A | 8/2017 |
| JP | 2018-123298 A | 8/2018 |
| WO | 2008/108408 A1 | 9/2008 |
| WO | 2011/052027 A1 | 5/2011 |
| WO | 2017/126629 A1 | 7/2017 |
| WO | 2017/126632 A1 | 7/2017 |

OTHER PUBLICATIONS

Machine-generated translation of Detailed Description of JP 2016-047885A; retrieved from ESPACENET on Jun. 3, 2022. (Year: 2016).*
Total Cray Valley Product Guide, 12 pages (Undated).*
Extended European Search Report dated Aug. 25, 2021 in European Application No. 18887836.7.
International Search Report of PCT/JP2018/041856 dated Feb. 12, 2019 [PCT/ISA/210].

* cited by examiner

*Primary Examiner* — Fred M Teskin
(74) *Attorney, Agent, or Firm* — Sughrue Mion, PLLC

(57) ABSTRACT

A rubber composition of the present invention contains 100 parts by mass of a rubber component (A) containing 45 to 75% by mass of natural rubber and 25 to 55% by mass of a conjugated diene-based polymer, in which a bonded styrene amount of the conjugated diene compound moieties is 25% or less, 1 to 40 parts by mass of a non-modified conjugated diene-based polymer (B) which has a weight average molecular weight of 5,000 or more but less than 40,000 in terms of polystyrene as measured by GPC and in which a bonded styrene amount of the conjugated diene compound moieties is less than 10% and a bonded vinyl amount of the conjugated diene compound moieties is 20% or more, and a filler (C), in which at least one of the conjugated diene-based polymers contained in the rubber component (A) is a modified conjugated diene-based polymer. With the rubber composition, a tire having further enhanced on-ice performance and having both excellent on-ice performance and excellent abrasion resistance is obtained.

12 Claims, No Drawings

RUBBER COMPOSITION AND PNEUMATIC TIRE

TECHNICAL FIELD

The present invention relates to a rubber composition and a pneumatic tire.

BACKGROUND ART

Conventionally, as a tire for having safe driving even on ice in addition to common road surfaces, a studless tire with softened tread rubber has been used, and it is known that the on-ice performance of a tire is enhanced by softening the tread rubber. However, a tire with soft tread rubber generally has a problem that the tire has poor abrasion resistance on common road surfaces so that there is a trade-off relationship between on-ice performance and abrasion resistance of the tire.

In this regard, to provide a rubber composition having enhanced friction coefficient on ice and an excellence in flexibility at low temperatures, wet-grip property and on-ice grip property, a rubber composition having as a rubber component at least one diene-based polymer selected from the group consisting of a natural rubber, an isoprene rubber, a styrene-butadiene rubber, a butadiene rubber, and an isobutylene-isoprene copolymer is disclosed, in which the rubber composition contains foamable bubbles in a rubber matrix and also contains, in an amount of 2 to 50 parts by weight based on 100 parts by weight of the rubber component, a low molecular weight styrene-butadiene copolymer in which (a) weight average molecular weight in terms of polystyrene is $0.2 \times 10^4$ to $8 \times 10^4$, (b) bonded styrene amount is 30% by weight or less, and (c) relationship of $S+(V/2)<25$, when S represents the bonded styrene amount and V represents the bonded amount of vinyl, is satisfied (refer to PTL 1, for example).

CITATION LIST

Patent Literature

PTL 1: JP 9-194640 A

SUMMARY OF INVENTION

Technical Problem

However, the rubber composition of PTL 1 has an insufficient balance between on-ice performance and abrasion resistance.

An object of the present invention is to provide a rubber composition allowing obtainment of a vulcanized rubber, which has further enhanced on-ice performance and has both excellent on-ice performance and excellent abrasion resistance, and a pneumatic tire which has further enhanced on-ice performance and has both excellent on-ice performance and excellent abrasion resistance, and, accordingly, the present invention aims to achieve the aforementioned object.

Solution to Problem

<1> A rubber composition containing 100 parts by mass of a rubber component (A) containing 45 to 75% by mass of natural rubber and 25 to 55% by mass of a conjugated diene-based polymer, in which a bonded styrene amount of the conjugated diene compound moieties is 25% or less, 1 to 40 parts by mass of a non-modified conjugated diene-based polymer (B) which has a weight average molecular weight of 5,000 or more but less than 40,000 in terms of polystyrene as measured by gel permeation chromatography and in which a bonded styrene amount of the conjugated diene compound moieties is less than 10% and a bonded vinyl amount of the conjugated diene compound moieties is 20% or more, and a filler (C), in which at least one of the conjugated diene-based polymers contained in the rubber component (A) is a modified conjugated diene-based polymer.

<2> The rubber composition described in <1>, in which the bonded vinyl amount of the conjugated diene compound moieties in the conjugated diene-based polymer (B) is 65% or less.

<3> The rubber composition described in <1> or <2>, in which the bonded vinyl amount of the conjugated diene compound moieties in the conjugated diene-based polymer (B) is 45% or more but 55% or less.

<4> The rubber composition described in any one of <1> to <3>, in which the conjugated diene-based polymer (B) is polybutadiene.

<5> The rubber composition described in any one of <1> to <4>, in which the conjugated diene-based polymer contained in the rubber component (A) contains polybutadiene rubber and styrene butadiene rubber.

<6> The rubber composition described in any one of <1> to <5>, in which the rubber composition contains a foaming agent.

<7> The rubber composition described in any one of <1> to <6>, in which the rubber composition contains a hydrophilic short fiber.

<8> A pneumatic tire having a tread portion formed from the rubber composition described in any one of <1> to <7>.

Advantageous Effects of Invention

According to the present invention, a rubber composition allowing obtainment of a vulcanized rubber, which has further enhanced on-ice performance and has both excellent on-ice performance and excellent abrasion resistance, and a pneumatic tire which has further enhanced on-ice performance and has both excellent on-ice performance and excellent abrasion resistance can be provided.

DESCRIPTION OF EMBODIMENTS

<Rubber Composition>

A rubber composition of the present invention contains 100 parts by mass of a rubber component (A) containing 45 to 75% by mass of natural rubber and 25 to 55% by mass of a conjugated diene-based polymer, in which a bonded styrene amount of the conjugated diene compound moieties is 25% or less, 1 to 40 parts by mass of a non-modified conjugated diene-based polymer (B) which has a weight average molecular weight of 5,000 or more but less than 40,000 in terms of polystyrene as measured by gel permeation chromatography and in which a bonded styrene amount of the conjugated diene compound moieties is less than 10% and a bonded vinyl amount of the conjugated diene compound moieties is 20% or more, and a filler (C), in which at least one of the conjugated diene-based polymers contained in the rubber component (A) is a modified conjugated diene-based polymer.

The conjugated diene-based polymer in which the bonded styrene amount of the conjugated diene compound moieties is 25% or less may be hereinafter referred to as "conjugated diene-based polymer (a)".

The rubber composition of the present invention may also contain, other than the rubber component (A), the conjugated diene-based polymer (B), and the filler (C), a foaming agent, a hydrophilic short fiber, or the like, for example.

As described above, there is a trade-off relationship between on-ice performance and abrasion resistance of a tire.

To have the on-ice braking performance of a tire such that, even on a frozen road surface, the tire hardly has a slip, the brake is working well, and the vehicle is driven with exhibited grip, it is required for the ground contact area of a tire (in particular, tread portion) to be flexible. Meanwhile, a flexible tire is easily worn out. As the rigidity of a tire is increased to enhance the abrasion resistance of a tire, the flexibility of a tire is lost, and thus a tire with excellent abrasion resistance has lower on-ice performance.

In this regard, as the rubber composition of the present invention has a constitution described above, the vulcanized rubber obtained from the rubber composition of the present invention and the pneumatic tire having a tread portion formed from the rubber composition of the present invention have not only a favorable balance between excellent on-ice performance and excellent abrasion resistance but also further enhanced on-ice performance compared to a related art.

Although the reasons are not clear, it is believed to be based on the following reasons.

The rubber component (A) contains 45 to 75% by mass of natural rubber and 25 to 55% by mass of a conjugated diene-based polymer in which a bonded styrene amount of the conjugated diene compound moieties is 25% or less [conjugated diene-based polymer (a)], and at least one of the conjugated diene-based polymer (a) is a modified conjugated diene-based polymer. From the viewpoint that the modified conjugated diene-based polymer has an interaction with the filler (C), it is believed that, between the natural rubber phase and the conjugated diene-based polymer (a) phase contained in the rubber component (A), the filler (C) is more likely get localized in the conjugated diene-based polymer (a) phase containing the modified conjugated diene-based polymer.

Meanwhile, as the bonded vinyl amount of the conjugated diene compound moieties is 20% or more, it is believed that the conjugated diene-based polymer (B) is more likely get localized in the natural rubber phase.

In general, when a rubber composition is flexibilized, on-ice performance is enhanced but abrasion resistance is greatly impaired. In a case in which the filler (C) is not localized in the conjugated diene-based polymer (a) phase, the reinforcing property of the natural rubber phase is enhanced to yield enhanced abrasion resistance but the elasticity of the rubber composition as a whole is greatly enhanced, and thus on-ice performance is deteriorated.

It is considered that, by localizing the conjugated diene-based polymer (B) in the natural rubber phase and localizing the filler (C) in the conjugated diene-based polymer (a) phase, the reinforcing property is ensured as reinforcement is obtained by localization of the filler (C) in the conjugated diene-based polymer (a) phase while the flexibility of the rubber composition is ensured as a whole, and thus both on-ice performance and abrasion resistance are obtained.

In the field of rubber, a rubber component contained in the rubber composition is generally a high molecular compound which has a weight average molecular weight of more than 200,000 in terms of polystyrene as measured by gel permeation chromatography. On the other hand, the conjugated diene-based polymer (B) has a weight average molecular weight of 5,000 or more but less than 40,000 in terms of polystyrene as measured by gel permeation chromatography, in other words, a low molecular-weight polymer, and thus it is believed that, for vulcanization of the rubber composition, the conjugated diene-based polymer (B) hardly forms a cross-linked structure with the rubber component (A). It is considered that, due to this reason, the rubber composition has the flexibility and also a function as a softening agent.

Furthermore, since the conjugated diene-based polymer (B) is not modified, it is believed that the filler (C) is more likely to get incorporated in the conjugated diene-based polymer (a) phase containing the modified conjugated diene-based polymer compared to the natural rubber phase containing the conjugated diene-based polymer (B).

As described above, it is believed that, in the rubber composition containing the rubber component (A) containing 45 to 75% by mass of natural rubber and 25 to 55% by mass of the conjugated diene-based polymer (a), by localizing in the conjugated diene-based polymer (a) phase the filler (C) that is likely to contribute to the rigidity of the rubber composition and localizing in the natural rubber phase the conjugated diene-based polymer (B) that is likely to contribute to the flexibility of the rubber composition, the vulcanized rubber obtained by vulcanization of the rubber composition and a tire having a tread portion obtained from the corresponding rubber composition have not only a favorable balance between excellent on-ice performance and excellent abrasion resistance but also further enhanced on-ice performance compared to a related art.

Hereinafter, the rubber composition and the pneumatic tire of the present invention will be described in detail.

[Rubber Component (A)]

The rubber composition of the present invention contains the rubber component (A) containing 45 to 75% by mass of natural rubber and 25 to 55% by mass of a conjugated diene-based polymer, in which a bonded styrene amount of the conjugated diene compound moieties is 25% or less [conjugated diene-based polymer (a)]. In addition, at least one of the conjugated diene-based polymer (a) contained in the rubber component (A) is a modified conjugated diene-based polymer.

Furthermore, the natural rubber and the conjugated diene-based polymer (a) contained in the rubber component (A) are a high molecular weight compound (high molecular compound) which has a weight average molecular weight of more than 200,000 in terms of polystyrene as measured by gel permeation chromatography.

When the content of the natural rubber in the rubber component (A) is less than 45% by mass, the rubber becomes excessively soft, yielding lower abrasion resistance. When the content is more than 75% by mass, the rubber becomes excessively hard, yielding lower on-ice performance. From this point of view, the content of the natural rubber in the rubber component (A) is preferably 48 to 70% by mass, and more preferably 50 to 65% by mass.

Furthermore, when the content of the conjugated diene-based polymer (a) in the rubber component (A) is less than 25% by mass, the rubber becomes excessively hard, yielding lower on-ice performance. When the content is more than 55% by mass, the rubber becomes excessively soft, yielding lower abrasion resistance. From this point of view, the content of the conjugated diene-based polymer (a) in the rubber component (A) is preferably 30 to 52% by mass, and more preferably 35 to 50% by mass.

(Conjugated diene-Based Polymer in which Bonded Styrene Amount of Conjugated diene Compound Moieties is 25% or Less)

As for the conjugated diene-based polymer in which a bonded styrene amount of the conjugated diene compound moieties is 25% or less [conjugated diene-based polymer (a)], at least one type thereof may be a modified conjugated diene-based polymer, or all may be a modified conjugated diene-based polymer. In addition, the conjugated diene-based polymer may be either a copolymer or a homopolymer. As the ratio of the modified conjugated diene-based polymer in the conjugated diene-based polymer (a) increases, it becomes easier to attract the filler (C) in the conjugated diene-based polymer (a) phase, and thus it becomes easier for the filler (C) to get localized in the conjugated diene-based polymer (a) phase.

The ratio of the modified conjugated diene-based polymer in the conjugated diene-based polymer (a) is, from the viewpoint of easily obtaining both excellent on-ice performance and excellent abrasion resistance, preferably 40% by mass or more, and more preferably 50% by mass or more.

Irrespective of being a modified polymer or a non-modified polymer, the conjugated diene-based polymer (a) has 25% or less of a bonded styrene amount (ratio of styrene unit contained in the polymer). When the bonded styrene amount of the conjugated diene compound moieties is more than 25%, the rigidity of the rubber composition becomes excessively high, and thus on-ice performance cannot be enhanced.

The bonded styrene amount of the conjugated diene-based polymer (a) is preferably 15% or less from the viewpoint of further enhancing on-ice performance.

The bonded styrene amount of the conjugated diene compound moieties in the conjugated diene-based polymer (a) can be adjusted based on the amount, polymerization degree, or the like of monomers to be used for polymerization. Furthermore, the bonded styrene amount of the conjugated diene compound moieties in the conjugated diene-based polymer (a) can be obtained by an infrared method (Morello method).

In addition, the bonded styrene amount and the bonded vinyl amount of a polymer may be also referred to as a micro structure of the polymer.

The conjugated diene-based polymer constituting the conjugated diene-based polymer (a) is not particularly limited as long as it is a polymer having a structural unit derived from a conjugated diene compound such as 1, 3-butadiene, 1, 3-pentadiene, 2, 3-dimethylbutadiene, and 1,3-hexadiene, and examples thereof include a styrene-butadiene copolymer rubber (SBR) and a polybutadiene rubber (BR).

Of them, a polybutadiene rubber (BR) is preferable.

Furthermore, with regard to the rubber component (A), to have easy localization of the conjugated diene-based polymer (B) in the natural rubber phase and the filler (C) in the conjugated diene-based polymer (a) phase, it is preferable that the natural rubber and the conjugated diene-based polymer (a) are not compatible with each other. Also from this point of view, the conjugated diene-based polymer (a) is preferably a styrene-butadiene copolymer rubber (SBR) and a polybutadiene rubber (BR).

The conjugated diene-based polymer (a) preferably has a butadiene skeleton. As the conjugated diene-based polymer (a) has a butadiene skeleton, the rubber composition becomes soft, and, when the rubber composition is used in a tread, the ground contact area of a tread becomes larger, and thus on-ice performance is further enhanced. Herein, examples of the conjugated diene-based polymer (a) having a butadiene skeleton include a polybutadiene rubber (BR) and a styrene-butadiene copolymer rubber (SBR), and, from the viewpoint of on-ice performance, it is particularly preferable to contain a polybutadiene rubber (BR). Furthermore, from the viewpoint of enhancing the hysteresis loss and enhancing on-ice performance, it is more preferable to additionally contain styrene butadiene rubber. In the case of containing styrene butadiene rubber, from the viewpoint of enhancing the hysteresis loss while suppressing excessive rigidity of the rubber composition, it is preferable that % by mass of the polybutadiene rubber is 5 to 25% by mass and % by mass of the styrene butadiene rubber is 5 to 25% by mass relative to the rubber component.

As it has been already described, at least one of the conjugated diene-based polymer (a) is a modified conjugated diene-based polymer. It is preferable that, in the modified conjugated diene-based polymer, the terminal of the conjugated diene-based polymer is modified.

From the viewpoint of having high affinity for the filler (C) (for example, silica), it is preferable for the modified conjugated diene-based polymer that the terminal of the conjugated diene-based polymer is modified with a silane compound. Examples of the silane compound include a silane compound having a glycidoxy group, an alkoxysilane compound, and a hydrocarbyloxysilane compound.

When the terminal of the conjugated diene-based polymer is modified with a silane compound, the modified conjugated diene-based polymer has a high interaction with silica, silica are distributed more in the conjugated diene-based polymer (a) phase containing the modified conjugated diene-based polymer, and, while providing micro-irregularities to the conjugated diene-based polymer (a) phase, it softens the conjugated diene-based polymer (a) phase. Due to this reason, when the rubber composition is used in a tread of a tire, the ground contact area of a tread becomes larger so that the on-ice performance of a tire is enhanced.

As for the modified conjugated diene-based polymer, it is possible to use a polymer or a copolymer of a conjugated diene compound that is obtained by using the conjugated diene compound as a monomer, or a copolymer of a conjugated diene compound and an aromatic vinyl compound that are obtained by using the conjugated diene compound and the aromatic vinyl compound as monomers. Furthermore, a product resulting from modification of the molecular terminal and/or main chain of those (co)polymers can be also used. Specifically, as a known modified conjugated diene-based polymer with a modified molecular terminal, the modified diene-based polymer disclosed in WO2003/029299, WO2003/046020, JP 2004-513987 A, JP 11-29603 A, JP 2003-113202 A, and JP 6-29338 B2 can be exemplified, and, as a known modified diene-based polymer with a modified main chain, the modified diene-based polymer disclosed in JP 2003-534426 A and JP 2002-201310 A can be exemplified.

The modified conjugated diene-based polymer with a modified molecular terminal can be produced by reacting the terminal of a conjugated diene-based polymer having an active terminal with various modifying agents according to the method described in WO2003/046020 or JP 2007-217562 A.

According to one preferred embodiment, the modified conjugated diene-based polymer with a modified molecular terminal can be produced by, according to the method described in WO02003/046020 or JP 2007-217562 A, reacting the terminal of a conjugated diene-based polymer having an active terminal, in which cis-1,4 bond content is 75% or more, with a silane compound (for example, hydrocarboyloxysilane compound) followed by performing stabilization based on a reaction with partial carboxylic acid ester of polyhydric alcohol.

Specific examples of the silane compound having a glycidoxy group include 2-glycidoxyethyltrimethoxysilane, 2-glycidoxyethyltriethoxysilane, (2-glycidoxyethyl) methyldimethoxysilane, 3-glycidoxypropyltrimethoxysilane, 3-glycidoxypropyltriethoxysilane, and (3-glycidoxypropyl) methyldimethoxysilane, and, of them, 3-glycidoxypropyltrimethoxysilane and 3-glycidoxypropyltriethoxysilane are particularly preferable.

Furthermore, the partial carboxylic acid ester of polyhydric alcohol means an ester between polyhydric alcohol and carboxylic acid, and also a partial ester having one or more hydroxy groups. Specifically, an ester between saccharides or modified saccharides having 4 or more carbon atoms and fatty acid is preferably used. More preferred examples of the ester include (1) a partial ester of fatty acid with polyhydric alcohol, in particular, a partial ester of saturated higher fatty acid or unsaturated higher fatty acid having 10 to 20 carbon atoms with polyhydric alcohol (it may be any of monoester, diester, and triester), and (2) an ester compound in which 1 to 3 partial esters of polycarboxylic acid with higher alcohol are bonded to polyhydric alcohol.

As the polyhydric alcohol used as a raw material of the partial ester, saccharides having at least 3 hydroxy groups and 5 or 6 carbon atoms (it may be either hydrogenated or not hydrogenated), glycol, a polyhydroxy compound, and the like are preferably used. Furthermore, as a fatty acid raw material, saturated or unsaturated fatty acid having 10 to 20 carbon atoms, for example, stearic acid, lauric acid, or palmitic acid, is used.

Among the partial esters of polyhydric alcohol with fatty acid, sorbitan fatty acid ester is preferable, and specific examples thereof include sorbitan monolaurate, sorbitan monopalmitate, sorbitan monostearate, sorbitan tristearate, sorbitan monooleate, and sorbitan trioelate.

The alkoxysilane compound is, although not particularly limited, more preferably an alkoxysilane compound that is represented by the following general formula (i).

In the general formula (i), $R^1$ and $R^2$ each independently represent a monovalent aliphatic hydrocarbon group having 1 to 20 carbon atoms or a monovalent aromatic hydrocarbon group having 6 to 18 carbon atoms, a is an integer of 0 to 2, and, when plural $OR^2$'s are present, the plural $OR^2$'s may be the same or different from each other, and no active proton is contained in the molecule.

Specific examples of the alkoxysilane compound that is represented by the general formula (i) include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimethyldimethoxysilane, methylphenyldimethoxysilane, dimethyldiethoxysilane, vinyltrimethoxysilane, vinyltriethoxysilane, and divinyldiethoxysilane. Of them, tetraethoxysilane, methyltriethoxysilane, and dimethyldiethoxysilane are suitable. The alkoxysilane compound may be used either singly or in combination of two or more types thereof.

The hydrocarbyloxysilane compound is preferably a hydrocarbyloxysilane compound that is represented by the following general formula (ii).

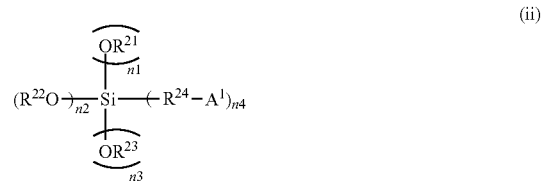

In the general formula (ii), n1+n2+n3+n4=4 (with the proviso that n2 is an integer of 1 to 4 and n1, n3 and n4 are an integer of 0 to 3).

$A^1$ is at least one functional group selected from a saturated cyclic tertiary amine compound residue, an unsaturated cyclic tertiary amine compound residue, a ketimine residue, a nitrile group, a (thio)isocyanate group, a (thio)epoxy group, an isocyanuric acid trihydrocarbyl ester group, a carbonic acid dihydrocarbyl ester group, a nitrile group, a pyridine group, a (thio)ketone group, a (thio)aldehyde group, an amide group, a (thio)carboxylic acid ester group, a metal salt of (thio)carboxylic acid ester, a carboxylic acid anhydride residue, a carboxylic acid halogen compound residue, a primary or secondary amino group having a hydrolyzable group, and a mercapto group having a hydrolyzable group.

In a case in which n4 is 2 or more, the plural $A^1$'s may be the same or different from each other, and $A^1$ may be also a divalent functional group which forms a cyclic structure by binding to Si.

$R^{21}$ is a monovalent aliphatic or alicyclic hydrocarbon group having 1 to 20 carbon atoms or a monovalent aromatic hydrocarbon group having 6 to 18 carbon atoms, and, when n1 is 2 or more, the plural $R^{21}$'s may be the same or different from each other.

$R^{23}$ is a monovalent aliphatic or alicyclic hydrocarbon group having 1 to 20 carbon atoms, a monovalent aromatic hydrocarbon group having 6 to 18 carbon atoms, or a halogen atom, and, when n3 is 2 or more, the plural $R^{23}$'s may be the same or different from each other.

$R^{22}$ is a monovalent aliphatic or alicyclic hydrocarbon group having 1 to 20 carbon atoms or a monovalent aromatic hydrocarbon group having 6 to 18 carbon atoms in which they all may contain a nitrogen atom and/or a silicon atom. When n2 is 2 or more, the plural $R^{22}$'s may be the same or different from each other, or all together may form a ring.

$R^{24}$ is a divalent aliphatic or alicyclic hydrocarbon group having 1 to 20 carbon atoms or a divalent aromatic hydrocarbon group having 6 to 18 carbon atoms, and, when n4 is 2 or more, the plural $R^{24}$'s may be the same or different from each other.

As a hydrolyzable group of the primary or secondary amino group having a hydrolyzable group or the mercapto group having a hydrolyzable group, a trimethylsilyl group or a tert-butyldimethylsilyl group is preferable, and a trimethylsilyl group is particularly preferable.

The hydrocarbyloxysilane compound represented by the general formula (ii) is preferably a hydrocarbyloxysilane compound that is represented by the following general formula (iii).

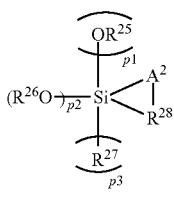

(iii)

In the general formula (iii), p1+p2+p3=2 (with the proviso that p2 is an integer of 1 to 2 and p1 and p3 are an integer of 0 to 1).

$A^2$ is NRa (Ra is a monovalent hydrocarbon group, a hydrolyzable group or a nitrogen-containing organic group), or sulfur.

$R^{25}$ is a monovalent aliphatic or alicyclic hydrocarbon group having 1 to 20 carbon atoms or a monovalent aromatic hydrocarbon group having 6 to 18 carbon atoms.

$R^{27}$ is a monovalent aliphatic or alicyclic hydrocarbon group having 1 to 20 carbon atoms, a monovalent aromatic hydrocarbon group having 6 to 18 carbon atoms, or a halogen atom.

$R^{26}$ is a monovalent aliphatic or alicyclic hydrocarbon group having 1 to 20 carbon atoms, a monovalent aromatic hydrocarbon group having 6 to 18 carbon atoms, or a nitrogen-containing organic group in which they all may contain a nitrogen atom and/or a silicon atom. When p2 is 2, the plural $R^{26}$'s may be the same or different from each other, or all together may form a ring.

$R^{28}$ is a divalent aliphatic or alicyclic hydrocarbon group having 1 to 20 carbon atoms or a divalent aromatic hydrocarbon group having 6 to 18 carbon atoms.

As a hydrolyzable group, a trimethylsilyl group or a tert-butyldimethylsilyl group is preferable, and a trimethylsilyl group is particularly preferable.

The hydrocarbyloxysilane compound represented by the general formula (ii) is preferably a hydrocarbyloxysilane compound that is represented by the following general formula (iv) or general formula (v).

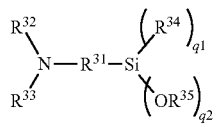

(iv)

In the general formula (iv), q1+q2=3 (with the proviso that q1 is an integer of 0 to 2 and q2 is an integer of 1 to 3).

$R^{31}$ is a divalent aliphatic or alicyclic hydrocarbon group having 1 to 20 carbon atoms or a divalent aromatic hydrocarbon group having 6 to 18 carbon atoms.

$R^{32}$ and $R^{33}$ are, each independently, a hydrolyzable group, a monovalent aliphatic or alicyclic hydrocarbon group having 1 to 20 carbon atoms, or a monovalent aromatic hydrocarbon group having 6 to 18 carbon atoms.

$R^{34}$ is a monovalent aliphatic or alicyclic hydrocarbon group having 1 to 20 carbon atoms or a monovalent aromatic hydrocarbon group having 6 to 18 carbon atoms, and, when q1 is 2, the plural $R^{34}$'s may be the same or different from each other.

$R^{35}$ is a monovalent aliphatic or alicyclic hydrocarbon group having 1 to 20 carbon atoms or a monovalent aromatic hydrocarbon group having 6 to 18 carbon atoms, and, when q2 is 2 or more, the plural $R^{35}$'s may be the same or different from each other.

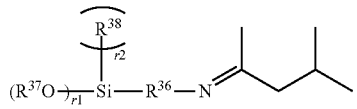

(v)

In the general formula (v), r1+r2=3 (with the proviso that r1 is an integer of 1 to 3 and r2 is an integer of 0 to 2).

$R^{36}$ is a divalent aliphatic or alicyclic hydrocarbon group having 1 to 20 carbon atoms or a divalent aromatic hydrocarbon group having 6 to 18 carbon atoms.

$R^{37}$ is a dimethylaminomethyl group, a dimethylaminoethyl group, a diethylaminomethyl group, a diethylaminoethyl group, a methylsilyl(methyl)aminomethyl group, a methylsilyl(methyl)aminoethyl group, a methylsilyl(ethyl)aminomethyl group, a methylsilyl(ethyl)aminoethyl group, a dimethylsilylaminomethyl group, a dimethylsilylaminoethyl group, a monovalent aliphatic or alicyclic hydrocarbon group having 1 to 20 carbon atoms, or a monovalent aromatic hydrocarbon group having 6 to 18 carbon atoms, and, when r1 is 2 or more, the plural $R^{37}$'s may be the same or different from each other.

$R^{38}$ is a hydrocarbyloxy group having 1 to 20 carbon atoms, a monovalent aliphatic or alicyclic hydrocarbon group having 1 to 20 carbon atoms, or a monovalent aromatic hydrocarbon group having 6 to 18 carbon atoms, and, when r2 is 2, the plural $R^{38}$'s may be the same or different from each other.

Specific examples of the alkoxysilane compound represented by the general formula (v) include N-(1, 3-dimethylbutylidene)-3-triethoxysilyl-1-propaneamine.

Meanwhile, the modified conjugated diene-based polymer with a modified main chain can be produced by, for example, (1) a method in which a (co)polymer of the above monomer is subjected to graft polymerization with a polar group-containing monomer, (2) a method in which the above monomer is subjected to copolymerization with a polar group-containing monomer, (3) a method in which a (co) polymer of the above monomer is added with a polar group-containing compound, or the like. Furthermore, the copolymerization using a polar group-containing monomer may be carried out by emulsion polymerization, living anion polymerization, or living radical polymerization. A copolymer of the above monomer and a polar group-containing monomer may be a copolymer resulting from block copolymerization of a monomer selected from a conjugated diene compound and an aromatic vinyl compound, and a polar group-containing monomer.

Furthermore, with regard to (1) the method in which a (co)polymer of a conjugated diene compound, an aromatic vinyl compound, or the like is subjected to graft polymerization with a polar group-containing monomer and (2) the method in which a conjugated diene compound, an aromatic vinyl compound, or the like is subjected to copolymerization with a polar group-containing monomer, the polar group-containing monomer to be used is preferably a polar group-containing vinyl-based monomer. Furthermore, with regard to (3) the method in which a (co)polymer of a conjugated diene compound, an aromatic vinyl compound, or the like is added with a polar group-containing compound, the polar group-containing compound to be used is preferably a polar group-containing mercapto compound. Furthermore, as a specific example of the polar group, an alkoxysilyl group or the like can be suitably mentioned.

Specific examples of the polar group-containing vinyl-based monomer include (meth)acryloxymethyltrimethoxysilane [herein, "(meth)acryloxy" indicates acryloxy and/or methacryloxy, and ditto for the followings], (meth) acryloxymethylmethyldimethoxysilane, (meth) acryloxymethyldimethylmethoxysilane, (meth) acryloxymethyltriethoxysilane, (meth) acryloxymethylmethyldiethoxysilane, (meth) acryloxymethyldimethylethoxysilane, (meth) acryloxymethyltrip rop oxysilane, (meth)acryloxymethylmethyldipropoxysilane, (meth)acryloxymethyldimethylpropoxysilane, y-meth)acryloxypropyltrimethoxysilane, y-meth) acryloxypropylmethyldimethoxysilane, y-meth) acryloxypropyldimethylmethoxysilane, y-meth) acryloxypropyltriethoxysilane, y-meth) acryloxypropylmethyldiethoxysilane, y-meth) acryloxypropyldimethylethoxysilane, y-meth) acryloxypropyltripropoxysilane, y-meth) acryloxypropylmethyldipropoxysilane, y-meth) acryloxypropyldimethylpropoxysilane, y-meth) acryloxypropylmethyldiphenoxysilane, y-meth) acryloxypropyldimethylphenoxysilane, y-meth) acryloxypropylmethyldibenzyloxysilane, y-meth) acryloxypropyldimethylbenzyloxysilane, trimethoxyvinylsilane, triethoxyvinylsilane, 6-trimethoxysilyl-1,2-hexene, and p-trimethoxysilyl styrene. These monomers may be used either singly or in combination of two or more types thereof.

Furthermore, specific examples of the polar group-containing mercapto compound include 3-mercaptopropyltrimethoxysilane, 3-mercaptopropyltriethoxysilane, 3-mercaptopropylmethyldimethoxysilane, 3-mercaptopropyldimethylmethoxysilane, 2-mercaptoethyltrimethoxysilane, 2-mercaptoethyltriethoxysilane, mercaptomethylmethyldiethoxysilane, and mercaptomethyltrimethoxysilane. These compounds may be used either singly or in combination of two or more types thereof.

Furthermore, it is preferable that the terminal of the modified conjugated diene compound is modified with a compound containing at least one of a tin atom (Sn) and a nitrogen atom (N). As the modified conjugated diene compound is modified with a compound containing at least one of a tin atom and a nitrogen atom, the interaction of the modified conjugated diene compound with carbon black is further enhanced, the dispersion property of carbon black in the conjugated diene-based polymer (a) phase, in which the modified conjugated diene compound is contained, is further enhanced, and the abrasion resistance of the rubber composition is further enhanced.

The modified conjugated diene compound of which molecular terminal is modified with a compound containing at least one of a tin atom (Sn) and a nitrogen atom (N) can be produced by, for example, a method in which, after the above monomer is subjected to living polymerization by using a polymerization initiator containing a tin atom and/or a nitrogen atom, the polymerization active terminal is modified with a modifying agent containing a tin atom and/or a nitrogen atom. Furthermore, the living polymerization is preferably carried out by anion polymerization.

In the case of producing a (co)polymer having an active terminal by anion polymerization, a lithium amide compound is preferable as a polymerization initiator. Examples of the lithium amide compound include lithium hexamethylene imide, lithium pyrrolizide, lithium piperizide, lithium heptamethylene imide, lithium dodecamethylene imide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperazide, lithium ethylpropylamide, lithium ethylbutylamide, lithium methylbutylamide, lithium ethylbenzylamide, and lithium methylphenethylamide.

Furthermore, as the above lithium amide compound, the formula: Li-AM [in the formula, AM is a substituted amino group represented by the following formula (I):

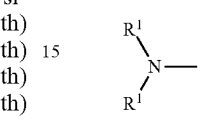

(I)

wherein $R^1$'s is, each independently, an alkyl group, a cylcoalkyl group, or an aralkyl group having 1 to 12 carbon atoms, or a cyclic amino group represented by the following formula (II):

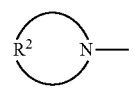

(II)

wherein $R^2$ represents an alkylene group, a substituted alkylene group, an oxyalkylene group, or an N-alkylamino-alkylene group which has 3 to 16 methylene groups].

In the above formula (I), $R^1$ is an alkyl group, a cycloalkyl group, or an aralkyl group having 1 to 12 carbon atoms, and, specifically, a methyl group, an ethyl group, a butyl group, an octyl group, a cyclohexyl group, a 3-phenyl-1-propyl group, an isobutyl group, and the like can be suitably mentioned. Furthermore, the plural $R^1$'s may be the same or different from each other.

Furthermore, in the above formula (II), $R^2$ is an alkylene group, a substituted alkylene group, an oxyalkylene group, or an N-alkylamino-alkylene group which has 3 to 16 methylene groups. Herein, mono-substituted to octa-substituted alkylene groups are included in the substituted alkylene group, and examples of the substituent include a linear or branched alkyl group, a cycloalkyl group, a bicycloalkyl group, an aryl group and an aralkyl group having 1 to 12 carbon atoms. Furthermore, as a specific example of $R^2$, a trimethylene group, a tetramethylene group, a hexamethylene group, an oxydiethylene group, an N-alkylazadiethylene group, a dodecamethylene group, a hexadecamethylene group, and the like are preferable.

The lithium amide compound may be used for the polymerization reaction after a preliminary preparation from a secondary amine and a lithium compound, but may be also produced in the polymerization system.

Herein, examples of the secondary amine include, other than dimethylamine, diethylamine, dibutylamine, dioctylamine, dicyclohexylamine, diisobutylamine, or the like, cyclic amines such as azacycloheptane (that is, hexamethyleneimine), 2-(2-ethylhexyl)pyrrolidine, 3-(2-propyl)pyrrolidine, 3, 5-bis(2-ethylhexyl)piperidine, 4-phenylpiperidine, 7-decyl-1-azacyclotridecane, 3, 3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1- azacycloheptadecane, 2-methyl-1-azacycloheptadec-9-ene, 3-isobutyl-1-azacyclododecane, 2-methyl-7-tert-butyl-1-azacyclododecane, 5-nonyl-1-azacyclododecane, 8-(4'-methylphenyl)-5-pentyl-3-azabicyclo[5.4.0] undecane, 1-butyl-6-azabicyclo[3.2.1]octane, 8-ethyl-3-azabicyclo [3.2.1] octane, 1-propyl-3-azabicyclo[3.2.2] nonane, 3-(tert-butyl)-7-azabicyclo [4.3. O] nonane, and 1, 5, 5-trimethyl-3-azabicyclo [4.4.01]decane.

Furthermore, as a lithium compound, ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, and hydrocarbyl lithium such as a reaction product between diisopropenylbenzene and butyl lithium can be used.

For the modification of the active terminal of a (co) polymer having an active terminal with a modifying agent, a modifying agent containing at least one of a tin atom and a nitrogen atom can be used as a modifying agent.

As a modifying agent containing a tin atom (that is, tin-containing compound), a tin-containing coupling agent represented by the following formula (III) is preferable:

(III)

wherein $R^3$ is, each independently, selected from the group consisting of an alkyl group having 1 to 20 carbon atoms, a cycloalkyl group having 3 to 20 carbon atoms, an aryl group having 6 to 20 carbon atoms, and an aralkyl group having 7 to 20 carbon atoms; X is, each independently, chlorine or bromine; a is 0 to 3 and b is 1 to 4 with the proviso that a+b=4. The modified conjugated diene-based polymer modified with the tin-containing coupling agent of the formula (III) has at least one kind of tin-carbon bond.

Herein, specific examples of $R^3$ include a methyl group, an ethyl group, an n-butyl group, a neophyl group, a cyclohexyl group, an n-octyl group, and a 2-ethylhexyl group. Furthermore, as the coupling agent of the formula (III), tin tetrachloride, $R^3SnCl_3$, $R^3_2SnCl_2$, $R^3_3SnCl$, and the like are preferable, and tin tetrachloride is particularly preferable.

Furthermore, as a modifying agent containing a nitrogen atom (that is, nitrogen-containing compound), a nitrogen-containing compound which has a substituted or unsubstituted amino group, amide group, imino group, imidazole group, nitrile group, pyridyl group, or the like can be mentioned, and, more specifically, N, N'-dimethylimidazolidinone (that is, 1, 3-dimethyl-2-imidazolidinone), N-methylpyrrolidone, 4-dimethylaminobenzylideneaniline, 4, 4'-bis (N, N-dimethylamino)benzophenone, 4, 4'-bis(N, N-diethylamino)benzophenone, 4-(N, N-dimethylamino) benzophenone, 4-(N, N-diethylamino)benzophenone, [4-(N, N-dimethylamino)phenyl]nethyl ethyl ketone, 4,4'-bis(1-hexamethyleneiminomethyl)benzophenone, 4, 4'-bis(1-pyrrolidinomethyl)benzophenone, 4-(1-hexamethyleneiminomethylkenzop henone, 4-(1-pyrrolidinomethylkenzophenone, [4-(1-hexamethyleneimino)phenyl]methyl ethyl ketone, 3-[N,N-methyl(trimethylsilyl)amino]propyldimethylethoxysilane, or the like can be mentioned. [Conjugated diene-Based Polymer (B)]

The rubber composition of the present invention contains the non-modified conjugated diene-based polymer (B) which has a weight average molecular weight of 5,000 or more but less than 40,000 in terms of polystyrene as measured by gel permeation chromatography and in which a bonded styrene amount of the conjugated diene compound moieties is less than 10% and a bonded vinyl amount of the conjugated diene compound moieties is 20% or more. Furthermore, the amount of the conjugated diene-based polymer (B) in the rubber composition of the present invention is an amount to have 1 to 40 parts by mass based on 100 parts by mass of the rubber component (A).

As the bonded vinyl amount of the conjugated diene compound moieties is 20% or more, the conjugated diene-based polymer (B) is more easily get localized in the natural rubber phase contained in the rubber component (A).

From the viewpoint of having easier localization of the conjugated diene-based polymer (B) in the natural rubber phase, the bonded vinyl amount of the conjugated diene compound moieties in the conjugated diene-based polymer (B) is preferably 30% or more, more preferably 40% or more, and even more preferably 45% or more. Furthermore, from the viewpoint of suppressing an increase in the rubber hardness, the bonded vinyl amount of the conjugated diene compound moieties in the conjugated diene-based polymer (B) is preferably 70% or less, more preferably 65% or less, and even more preferably 55% or less.

As the conjugated diene-based polymer (B), which is present at 1 to 40 parts by mass based on 100 parts by mass of the rubber component (A), is localized in the natural rubber phase, the rubber composition is provided with flexibility and the on-ice performance of a tire having a vulcanized rubber or a tread portion, which is obtained from the rubber composition, can be enhanced.

Furthermore, when the amount of the conjugated diene-based polymer (B) based on 100 parts by mass of the rubber component (A) is less than 1 part by mass, the rubber composition cannot be provided with flexibility. On the other hand, when the amount is more than 40 parts by mass, the rigidity of the rubber composition is impaired so that the abrasion resistance of a tire having a vulcanized rubber or a tread portion, which is obtained from the rubber composition, is lowered.

From the viewpoint of further enhancing the on-ice performance of a tire having a vulcanized rubber or a tread portion, which is obtained from the rubber composition, and obtaining both excellent on-ice performance and excellent abrasion resistance, the amount of the conjugated diene-based polymer (B) based on 100 parts by mass of the rubber component (A) is preferably 5 to 35 parts by mass, more preferably 10 to 30 parts by mass, and even more preferably 15 to 25 parts by mass.

The conjugated diene-based polymer (B) has a low molecular weight since a cross-linked structure is not formed with the rubber component (A) even when the rubber composition is vulcanized. Specifically, the weight average molecular weight in terms of polystyrene as measured by gel permeation chromatography (hereinafter, also may be simply referred to as the weight average molecular weight) is 5,000 or more but less than 40,000.

When the weight average molecular weight of the conjugated diene-based polymer (B) is less than 5,000, there is a possibility that, as the vulcanized rubber or the tread portion, which is obtained from the rubber composition, of a tire become excessively flexible, abrasion resistance is impaired. On the other hand, when the weight average molecular weight of the conjugated diene-based polymer (B) is 40,000 or more, there is a possibility that, as the flexibility is lost, the on-ice performance of a tire having a vulcanized rubber or a tread portion, which is obtained from the rubber composition, is impaired.

From the viewpoint of further enhancing the on-ice performance of a tire having a vulcanized rubber or a tread portion, which is obtained from the rubber composition, and obtaining both excellent on-ice performance and excellent abrasion resistance, the weight average molecular weight of the conjugated diene-based polymer (B) is preferably 6,000 to 30,000, more preferably 7,000 to 27,500, and even more preferably 8,000 to 20,000.

In the conjugated diene-based polymer (B), the bonded styrene amount of the conjugated diene compound moieties is less than 10%. When the bonded styrene amount of the conjugated diene compound moieties is 10% or more, there is a possibility that, as the flexibility of the rubber composition is lost, the on-ice performance of a tire having a vulcanized rubber or a tread portion, which is obtained from the on-ice rubber composition, is impaired.

In the conjugated diene-based polymer (B), the bonded styrene amount of the conjugated diene compound moieties is preferably 5% or less, more preferably 3% or less, and even more preferably 0%.

Furthermore, as the conjugated diene-based polymer (B) is a non-modified polymer, it is difficult to have an interaction with the filler (C) so that the inclusion of the filler (C) in the natural rubber phase can be inhibited.

The conjugated diene-based polymer (B) is not particularly limited as long as it has a specific weight average molecular weight, inhibits the bonded styrene amount of the conjugated diene compound moieties to less than a constant value, and has a specific bonded vinyl amount, but the conjugated diene-based polymer (B) is preferably a homopolymer of a conjugated diene compound or a copolymer of an aromatic vinyl compound and a conjugated diene compound. Herein, examples of the conjugated diene compound as a monomer include 1,3-butadiene, isoprene, 1, 3-pentadiene, 2, 3-dimethylbutadiene, 2-phenyl-1, 3-butadiene, and 1,3-hexadiene, and, of them, 1,3-butadiene and isoprene are preferable. Meanwhile, examples of the aromatic vinyl compound as a monomer include styrene, p-methyl styrene, m-methyl styrene, p-tert-butyl styrene, α-methyl styrene, chloromethyl styrene, and vinyltoluene.

As the conjugated diene-based polymer (B), any one of polybutadiene and polyisoprene or both of them is preferable, and polybutadiene is more preferable. Furthermore, these monomers may be used either singly or in combination of two or more types thereof.

In a case in which the conjugated diene-based polymer (B) is an aromatic vinyl compound-conjugated diene compound copolymer, the bonded amount of the aromatic vinyl compound is preferably less than 5% by mass. As the bonded amount of the aromatic vinyl compound is less than 5% by mass, hardness of the rubber increases so that a deterioration of on-ice performance can be inhibited.

A method for producing the conjugated diene-based polymer (B) is not particularly limited, and the conjugated diene-based polymer (B) can be obtained by, for example, polymerizing only a conjugated diene compound as a monomer or a mixture of an aromatic vinyl compound and a conjugated diene compound as a monomer in a hydrocarbon solvent that is inert to the polymerization reaction.

As a polymerization initiator used for synthesis of the conjugated diene-based polymer (B), a lithium compound is preferable, and n-butyl lithium is more preferable. In a case in which a lithium compound is used as a polymerization initiator, the aromatic vinyl compound and the conjugated diene compound are polymerized by anion polymerization.

A method for producing the conjugated diene-based polymer (B) by using a polymerization initiator is not particularly limited as described above. For example, the conjugated diene-based polymer (B) can be produced by polymerizing a monomer in a hydrocarbon solvent that is inert to the polymerization reaction.

Herein, examples of the hydrocarbon solvent that is inert to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These may be used either singly or in combination or two or more types thereof.

It is favorable to carry out the polymerization reaction in the presence of a randomizer.

With a randomizer, the micro structure of the conjugated diene compound moieties of a (co)polymer can be controlled, and, more specifically, the randomizer has an activity of controlling the bonded vinyl amount of the conjugated diene compound moieties of a (co)polymer, randomizing the conjugated diene compound unit and the aromatic vinyl compound unit in a copolymer, or the like.

Examples of the randomizer include dimethoxybenzene, tetrahydrofuran, dimethoxyethane, diethylene glycol dibutyl ether, diethylene glycol dimethyl ether, ditetrahydrofurylpropane, triethylamine, pyridine, N-methylmorpholine, N, N, N',N'-tetramethylethylenediamine, 1,2-dipiperidinoethane, potassium-t-amylate, potassium-t-butoxide, and sodium-t-amylate. The amount of these randomizers used is preferably in a range of 0.1 to 100 molar equivalents per mol of the polymerization initiator.

The anion polymerization is preferably carried out by solution polymerization, and the concentration of the monomer in a polymerization reaction solution is preferably in a range of 5 to 50% by mass, and more preferably in a range of 10 to 30% by mass. Furthermore, when the conjugated diene compound and the aromatic vinyl compound are used in combination, the content ratio of the aromatic vinyl compound in the monomer mixture can be suitably selected depending on the amount of the aromatic vinyl compound in a target copolymer. Furthermore, the polymerization mode is not particularly limited and may be either a batch mode or a continuous mode.

The polymerization temperature of the anion polymerization is preferably in a range of 0 to 150° C., and more preferably in a range of 20 to 130° C. Furthermore, although the polymerization can be carried out under developed pressure, but, in general, it is preferable to carry out the polymerization under a pressure that is sufficient for substantially maintaining the monomer to be used in a liquid phase. Herein, in a case in which the polymerization reaction is carried out under a pressure that is higher than the developed pressure, it is preferable to pressurize the reaction system with inert gas. Furthermore, as for raw materials of a monomer, a polymerization initiator, a solvent, and the like used for the polymerization, it is also preferable to use those from which a reaction-inhibiting material such as water, oxygen, carbon dioxide, or a protic compound is removed in advance.

The weight average molecular weight, the bonded styrene amount of the conjugated diene compound moieties, and the bonded vinyl amount of the conjugated diene compound moieties in the conjugated diene-based polymer (B) can be adjusted in accordance with an amount, polymerization degree, or the like of a monomer to be used for the polymerization. Furthermore, the bonded styrene amount of the conjugated diene compound moieties and the bonded vinyl amount of the conjugated diene compound moieties in the conjugated diene-based polymer (B) (also may be referred to as a micro structure of the conjugated diene-based polymer (B)) can be obtained by an infrared method (Morello method).

[Filler (C)]

The rubber composition of the present invention contains the filler (C).

Due to an interaction with the modified conjugated diene-based polymer in the conjugated diene-based polymer (a) phase that is contained in the rubber component (A), the filler (C) is easily localized in the conjugated diene-based polymer (a) phase.

Herein, the description "the filler (C) is localized in the conjugated diene-based polymer (a) phase" means that more than 50% by mass of the filler (C) among the entire filler (C) contained in the rubber composition of the present invention is present in the conjugated diene-based polymer (a) phase, and localization of the filler (C) in the conjugated diene-based polymer (a) phase can be determined by observing a cross-section of the rubber composition by a scanning electron microscope (SEM).

The filler (C) is preferably a reinforcing filler which easily provides the rubber composition with rigidity, and examples thereof include inorganic fillers such as silica, clay, talc, calcium carbonate, and aluminum hydroxide, and carbon black. The type of the filler (C) is not particularly limited, and any filler can be selected from those conventionally used as a filler for rubber, and used. However, it is preferable to contain both or one of carbon black and silica, and it is more preferable to contain both of them.

In a case of using an inorganic filler such as silica, it is also possible to use a silane coupling agent in combination.
(Silica)

It is preferable for the rubber composition of the present invention to contain silica.

The cetyltrimethyl ammonium bromide (CTAB) specific surface area of silica is preferably 50 $m^2/g$ or more, and more preferably 90 $m^2/g$ or more. Furthermore, the CTAB specific surface area is preferably 350 $m^2/g$ or less, and more preferably 300 $m^2/g$ or less. When the CTAB specific surface area of silica is 50 $m^2/g$ or more, abrasion resistance is further enhanced. In addition, when the CTAB specific surface area of silica is 350 $m^2/g$ or less, rolling resistance becomes smaller.

Silica is not particularly limited, and examples thereof include wet method silica (hydrous silica), dry method silica (anhydrous silica), calcium silicate, and aluminum silicate. Of them, wet method silica is preferable. These types of silica may be used either singly or in combination of two or more types thereof.

The content of the silica in the rubber composition of the present invention is, based on 100 parts by mass of the rubber component (A) in total, preferably 20 parts by mass or more, more preferably 25 parts by mass or more, and even more preferably 30 parts by mass or more, and the content is also preferably 60 parts by mass or less, and more preferably 50 parts by mass or less. As the content of the silica is set at 20 parts by mass or more based on 100 parts by mass of the rubber component (A) in total, on-ice performance can be further enhanced. Furthermore, as the content of the silica is set at 60 parts by mass or less based on 100 parts by mass of the rubber component (A) in total, favorable workability of the rubber composition can be obtained.
(Carbon Black)

It is preferable for the rubber composition of the present invention to contain carbon black.

Carbon black reinforces a polymer phase formed of the rubber component (A) to enhance abrasion resistance.

The carbon black is not particularly limited, and examples thereof include carbon black with grade of GPF, FEF, HAF, ISAF, or SAF. These types of carbon black may be used either singly or in combination of two or more types thereof.

The content of the carbon black in the rubber composition of the present invention is, based on 100 parts by mass of the rubber component (A) in total, preferably 10 parts by mass or more, more preferably 20 parts by mass or more, and even more preferably 30 parts by mass or more, and the content is also preferably 60 parts by mass or less, and more preferably 50 parts by mass or less. As the content of the carbon black is set at 20 parts by mass or more based on 100 parts by mass of the rubber component (A) in total, abrasion resistance can be further enhanced. Furthermore, as the content of the carbon black is set at 60 parts by mass or less based on 100 parts by mass of the rubber component (A) in total, favorable workability of the rubber composition can be obtained.

It is preferable for the rubber composition of the present invention that the content of the silica is preferably 20 parts by mass or more and the content of the carbon black is 20 parts by mass or more based on 100 parts by mass of the rubber component (A) in total. In this case, as on-ice performance is further enhanced by containing the silica in an amount of 20 parts by mass or more and abrasion resistance is further enhanced by containing the carbon black in an amount of 20 parts by mass or more, the on-ice performance and abrasion resistance of a tire can be improved to a high level when the rubber composition is applied to a tire.

Furthermore, the total content of the silica and the carbon black is preferably 50 parts by mass or more and more preferably 60 parts by mass or more based on 100 parts by mass of the rubber component (A) in total. When a rubber composition containing the silica and the carbon black in a total amount of 50 parts by mass or more based on 100 parts by mass of the rubber component (A) in total is used in a tread of a tire, the on-ice performance and abrasion resistance of a tire are further enhanced.
(Silane Coupling Agent)

It is preferable for the rubber composition of the present invention to additionally contain a silane coupling agent.

As for the silane coupling agent, a silane coupling agent commonly used in the rubber industry can be used.
[Foaming Agent]

It is preferable for the rubber composition of the present invention to additionally contain a foaming agent.

When the rubber composition contains a foaming agent, bubbles originating from the foaming agent are formed in a vulcanized rubber at the time of producing a vulcanized rubber by vulcanization of a rubber composition. Accordingly, when a tire is manufactured by using the rubber composition containing foaming agent in a tread, the on-ice performance of a tire can be further enhanced due to the water-drain effect by the bubbles in the tread.

Specific examples of the foaming agent include azodicarbonamide (ADCA), dinitrosopentamethylenetetramine (DPT), dinitrosopentastyrenetetramine or benzene sulfonylhydrazide derivatives, p,p'-oxybisbenzene sulfonylhydrazide (OBSH), ammonium bicarbonate, sodium bicarbonate and ammonium carbonate which generate carbon dioxide, nitrososulfonylazo compounds which generate nitrogen, N,N'-dimethyl-N,N'-dinitrosophtalamide, toluene sulfonyl hydrazide, p-toluene sulfonyl semicarbazide, and p,p'-oxybisbenzene sulfonyl semicarbazide. Of them, azodicarbonamide (ADCA) and dinitrosopentamethylenetetramine (DPT) are preferable from the viewpoint of the processability in production, and azodicarbonamide (ADCA) is more preferable. These foaming agents may be used either singly or in combination of two or more types thereof.

The content of the foaming agent in the rubber composition is not particularly limited and is preferably in a range of 0.1 to 30 parts by mass, and more preferably in a range of 1 to 20 parts by mass based on 100 parts by mass of the rubber component.

In a case in which the foaming agent is used for foaming the vulcanized rubber, it is preferable that, as a foaming aid, urea, zinc stearate, zinc benzene sulfinate, zinc oxide, or the like are used in combination. These may be used either singly or in combination of two or more types thereof. Using a foaming aid in combination facilitates the foaming reaction and increases the degree of completeness of the reaction, and thus unnecessary degradation can be inhibited over time.

The vulcanized rubber obtained after vulcanizing the rubber composition containing a foaming agent has a foaming ratio of usually 1 to 50%, and preferably 5 to 40%. In a case in which a foaming agent is mixed, the voids on the surface of rubber are also enlarged when the foaming ratio is excessively high, thus yielding a possibility of not having a sufficient ground contact area. However, with the foaming ratio falling within the above range, it is possible to maintain the amount of bubbles at suitable level while ensuring the generation of bubbles which effectively function as a water-drain groove, and thus durability is less likely to get lost. In this regard, the foaming ratio of the vulcanized rubber means an average foaming ratio Vs, and, specifically, means a value calculated by the following formula (1).

$$V_S = (\rho_0/\rho_1 - 1) \times 100 (\%) \qquad (1)$$

In the formula (1), $\rho_1$ represents the density (g/cm$^3$) of the vulcanized rubber (foamed rubber) and $\rho_0$ represents the density (g/cm$^3$) of the solid phase of the vulcanized rubber (foamed rubber).

(Hydrophilic Short Fiber)

It is preferable for the rubber composition of the present invention to contain a hydrophilic short fiber.

When the rubber composition contains a hydrophilic short fiber and a foaming agent, gas generated from the foaming agent during vulcanization can infiltrate inside of the hydrophilic short fiber and form bubbles having a shape which corresponds to the shape of the hydrophilic short fiber. Furthermore, by being covered with a resin derived from the hydrophilic short fiber, the wall surface of the bubbles is hydrophilized. Due to this reason, when a tire is manufactured by using the rubber composition containing a hydrophilic short fiber and a foaming agent in a tread, the wall surface of the bubbles is exposed on a tread surface at the time of using the tire, and thus the affinity for water is enhanced and the bubbles can actively take up water. Accordingly, the tire is provided with an excellent water-drain property, and thus the on-ice performance of a tire can be enhanced dramatically.

Examples of the hydrophilic resin to be used as a raw material of the hydrophilic short fiber include an ethylene-vinyl alcohol copolymer, a vinyl alcohol homopolymer, poly(meth)acrylic acid or an ester thereof, polyethylene glycol, a carboxyvinyl copolymer, a styrene-maleic acid copolymer, polyvinylpyrrolidone, a vinyl pyrrolidone-vinyl acetate copolymer, and mercaptoethanol. Of them, an ethylene-vinyl alcohol copolymer, a vinyl alcohol homopolymer, and poly(meth)acrylic acid are preferable, and an ethylene-vinyl alcohol copolymer is particularly preferable.

It is also possible to form a coating layer, which has affinity for the rubber component (A) and is preferably composed of a low-melting point resin having a melting point lower than the maximum vulcanization temperature of the rubber composition, on a surface of the hydrophilic short fiber. By forming such a coating layer, favorable affinity between the coating layer and the rubber component (A) is obtained while effectively maintaining the affinity of the hydrophilic short fiber for water, and thus the dispersion property of the short fiber for the rubber component (A) is enhanced. Furthermore, as the low-melting point resin is melt during vulcanization to yield a coating layer with fluidity, it contributes to the adhesion between the rubber component (A) and the hydrophilic short fiber, and thus a tire provided with favorable water-drain property and durability can be easily achieved. Furthermore, the thickness of the coating layer may vary depending on the content, average diameter, or the like of the hydrophilic short fiber, and is generally 0.001 to 10 μm, and preferably 0.001 to 5 μm.

The melting point of the low-melting point resin to be used for a coating layer is preferably lower than the maximum vulcanization temperature of the rubber composition. Furthermore, the maximum vulcanization temperature means the maximum temperature that can be reached by the rubber composition during vulcanization of the rubber composition. For example, in the case of mold vulcanization, the maximum vulcanization temperature means the maximum temperature that is reached by the rubber composition during a period from entering into a mold to exiting from a mold of the rubber composition for cool down. The maximum vulcanization temperature can be measured, for example, by embedding a thermocouple in the rubber composition. The upper limit of the melting point of the low-melting point resin is, although not particularly limited, preferably selected by considering the above. In general, the upper limit is preferably lower by 10° C. or more, and more preferably lower by 20° C. or more than the maximum vulcanization temperature of the rubber composition. Furthermore, the industrial vulcanization temperature of a rubber composition is generally about 190° C. at most, but, when the maximum vulcanization temperature is set at 190° C., the melting point of the low-melting point resin is selected from a range that is lower than 190° C., in general. The melting point is preferably 180° C. or lower, and more preferably 170° C. or lower.

As the low-melting point resin, a polyolefin-based resin is preferable, and examples thereof include polyethylene, polypropylene, polybutene, polystyrene, an ethylene-propylene copolymer, an ethylene-methacrylic acid copolymer, an ethylene-ethyl acrylate copolymer, an ethylene-propylene-diene ter-copolymer, an ethylene-vinyl acetate copolymer, and an ionomer resin thereof.

The hydrophilic short fiber has an average length of preferably 0.1 to 50 mm, and more preferably 1 to 7 mm, and an average diameter of preferably 1 μm to 2 mm, and more preferably 5 μm to 0.5 mm. As the average length and the average diameter are within the above range, it is not likely to have an excessive entanglement among the short fibers, and thus a favorable dispersion property can be ensured.

The content of the hydrophilic short fiber in the rubber composition is preferably in a range of 0.1 to 100 parts by mass, more preferably in a range of 1 to 50 parts by mass, and even more preferably in a range of 1 to 10 parts by mass based on 100 parts by mass of the rubber component (A) in total. By setting the content of the hydrophilic short fiber within the above range, a good balance between on-ice performance and abrasion resistance can be obtained.

The surface of the hydrophilic short fiber may be also coated with a surfactant, mineral oil, castor oil, or the like. By having such coating, it is not likely to have an excessive entanglement among the short fibers, and thus a favorable dispersion property can be ensured.

(Various Components)

The rubber composition of the present invention may suitably select and contain, with the rubber component (A), the conjugated diene-based polymer (B), and the filler (C) that are described above and also a silane coupling agent, a foaming agent, and a hydrophilic short fiber that are contained depending on necessity, various components that are normally used in the rubber industry, such as a softening agent, a resin, a processability improving agent, stearic acid, an anti-aging agent, zinc oxide, a vulcanization accelerator, and a vulcanizing agent within a range in which the object of the present invention is not interfered.

[Softening Agent]

The rubber composition of the present invention may or may not contain a softening agent.

In general, as the rubber composition contains a softening agent, the processability of the rubber composition is enhanced and the vulcanized rubber is provided with flexibility. However, since the conjugated diene-based polymer (B) also has a function of a softening agent, it is acceptable that the rubber composition of the present invention does not contain a softening agent. On the other hand, the rubber composition of the present invention can also contain a softening agent in addition to the conjugated diene-based polymer (B).

Examples of the softening agent include a petroleum-based softening agent such as process oil, lubricating oil, naphthene oil, paraffin, fluid paraffin, petroleum asphalt, and Vaseline, a fatty oil-based softening agent such as castor oil, linseed oil, rapeseed oil, and palm oil, and waxes such as beeswax, carnauba wax, and lanolin. These softening agents may be used either singly or in combination of two or more types thereof.

The content of the softening agent in the rubber composition of the present invention is preferably 20 parts by mass or less, and more preferably 15 parts by mass or less based on 100 parts by mass of the rubber component.

[Resin]

It is preferable for the rubber composition of the present invention to contain a resin.

Examples of the rein include a $C_5$-based resin, a $C_5$-$C_9$-based resin, a $C_9$-based resin, a terpene-based resin, a dicyclopentadiene resin, and a terpene-aromatic compound-based resin, and theses resins may be used either singly or in combination of two or more types thereof.

It is preferable for the rubber composition of the present invention to contain a $C_5$-based resin or a terpene-based resin. As the rubber composition containing $C_5$-based resin or terpene-based resin is used for a tire, the on-ice performance of a tire can be further enhanced.

Examples of the $C_5$-based resin include an aliphatic petroleum resin obtained by (co)polymerization of $C_5$ fraction produced from petrochemical industry, which is obtained by thermal degradation of naphtha.

In $C_5$ fraction, an olefin-based hydrocarbon such as 1-pentene, 2-pentene, 2-methyl-1-butene, 2-methyl-2-butene, and 3-methyl-1-butene, a diolefin-based hydrocarbon such as 2-methyl-1,3-butadiene, 1,2-pentadiene, 1, 3-pentadiene, and 3-methyl-1,2-butadiene, and the like are included. Furthermore, a commercially available product can be also used as a $C_5$-based resin.

Furthermore, the content of the $C_5$-based resin is, although not particularly limited, preferably in a range of 5 to 50 parts by mass, more preferably in a range of 13 to 43 parts by mass, and even more preferably in a range of 15 to 25 parts by mass based on 100 parts by mass of the rubber component (A) in total. As the content of the $C_5$-based resin is 5 parts by mass or more, on-ice performance is sufficiently enhanced, and also, as the content is 50 parts by mass or less, sufficient abrasion resistance can be ensured.

In addition, the rubber composition of the present invention may also contain a $C_5$-$C_9$-based resin.

When the rubber composition containing $C_5$-$C_9$-based resin is used for a tire, the on-ice performance of a tire can be further enhanced.

The $C_5$-$C_9$-based resin indicates a $C_5$-$C_9$-based synthetic petroleum resin, and, as the $C_5$-$C_9$-based resin, a solid polymer obtained by polymerizing $C_5$-$C_{11}$ fractions derived from petroleum oil by using a Friedel-Crafts catalyst such as $AlCl_3$ and $BF_3$ can be mentioned, and more specific examples thereof include a copolymer which has styrene, vinyltoluene, α-methyl styrene, indene, or the like as a main component.

As the $C_5$-$C_9$-based resin, a resin having a small amount of components of $C_9$ or higher is preferable from the viewpoint of the compatibility with the rubber component (A). Herein, the description "having a small amount of components of $C_9$ or higher" means that components of $C_9$ or higher is less than 50% by mass and preferably 40% by mass or less of the total amount of the resin. As the $C_5$-$C_9$-based resin, a commercially available product may be used, and examples thereof include the product name "Quintone (trademark) G100B" (manufactured by Zeon Corporation) and the product name "ECR213" (manufactured by ExxonMobil Chemical Company).

The content of the $C_5$-$C_9$-based resin is, although not particularly limited, more preferably in a range of 13 to 43 parts by mass based on 100 parts by mass of the rubber component (A) in total. As the content of the $C_5$-$C_9$-based resin is 13 parts by mass or more, on-ice performance is sufficiently enhanced, and also, as the content is 43 parts by mass or less, sufficient abrasion resistance can be ensured.

[Method for Producing Rubber Composition]

A method for producing the rubber composition of the present invention is not particularly limited, but the rubber composition can be produced, for example, by mixing the rubber component (A), the conjugated diene-based polymer (B), and the filler (C) with various components, which are appropriately selected depending on necessity, followed by kneading, heating, extrusion or the like.

<Pneumatic Tire and Studless Tire>

The tire of the present invention is obtained by using the rubber composition of the present invention for a tread portion.

As described in the above, the vulcanized rubber resulting from the rubber composition of the present invention has further enhanced on-ice performance and has both excellent on-ice performance and excellent abrasion resistance, and thus the vulcanized rubber is suitable for a tread portion of a pneumatic tire and particularly suitable for a studless tire.

Depending on the type or a member of a tire to be applied, a pneumatic tire may be obtained by molding the unvulcanized rubber composition followed by vulcanization or may be obtained by firstly having semi-vulcanized rubber obtained through a preparatory vulcanization step or the like, performing molding using the semi-vulcanized rubber composition, and then additionally performing main vulcanization. Furthermore, as for the gas to be filled in the pneumatic tire, other than ordinary air or air with adjusted oxygen partial pressure, inert gas such as nitrogen, argon, and helium can be used.

EXAMPLES

Hereinafter, the present invention will be described in more detail in view of Examples, but Examples are given for the purpose of exemplifying the present invention and do not limit the present invention at all.

<Preparation of rubber composition>

Examples 1, 3, 6 to 10, and 13 and Comparative Examples 2, 4, and 6 to 8

With the mixing formulation shown in Table 2 to Table 6, rubber compositions of Examples and Comparative Examples were prepared by carrying out mixing in order of a first mixing step and a final mixing step using a common Banbury mixer. In addition, after the completion of the first mixing step, the mixture was extracted first from the Banbury mixer, the mixture was thereafter added again to the Banbury mixer, and the final mixing step was carried out. In addition, the maximum temperature of the mixture in the first mixing step was set at 170° C., and the maximum temperature of the rubber composition in the final mixing step was set at 110° C.

Examples 2, 4, 5, 11, and 12 and Comparative Examples 1, 3, and 5

With the mixing formulation shown in Table 2 to Table 6, rubber compositions of Examples and Comparative Examples are prepared by carrying out mixing in order of a first mixing step and a final mixing step using a common Banbury mixer. In addition, after the completion of the first mixing step, the mixture is extracted first from the Banbury mixer, the mixture is thereafter added again to the Banbury mixer, and the final mixing step is carried out. In addition, the maximum temperature of the mixture in the first mixing step is set at 170° C., and the maximum temperature of the rubber composition in the final mixing step is set at 110° C.

<Constitutional Components of Rubber Composition>

Details of each component in Table 2 to Table 6 are as follows.

[Rubber Component]

Polybutadiene rubber: high-cis polybutadiene rubber, product name "UBEPOL 150L", manufactured by Ube Industries, Ltd., bonded styrene amount of conjugated diene compound moieties: 0%)

Modified polybutadiene rubber 1: modified polybutadiene rubber 1 synthesized by the following method Modified polybutadiene rubber 2: modified polybutadiene rubber 2 synthesized by the following method Styrene butadiene rubber: styrene butadiene rubber synthesized by the following method (bonded styrene amount of conjugated diene compound moieties: 10%)

Modified styrene butadiene rubber: modified styrene butadiene rubber synthesized by the following method

[Filler, Silane Coupling Agent, and Oil]

Carbon black: N134, manufactured by Asahi Carbon Co., Ltd., specific surface area of nitrogen adsorption (N2SA)= 146 m$^2$/g Silica: product name "Nipsil AQ" manufactured by Tosoh Silica Corporation, CTAB specific surface area=150 m$^2$/g, specific surface area of nitrogen adsorption (N2SA)=200 m$^2$/g Silane coupling agent: "Si69", manufactured by Evonic Industries AG Process oil: naphthene-based process oil, product name "Diana process oil NS-24", manufactured by Idemitsu Kosan Co., Ltd.

[Polymer]

Polymers 1 to 7: polymers 1 to 7 described below

[Various Components]

Resin: product name "Escorez 1102", manufactured by Tonen Chemical Corporation (C$_5$-based resin)

Wax: Microcrystalline wax

Anti-aging agent: N-phenyl-N'-(1,3-dimethyl-butyl)-p-phenylenediamine Hydrophilic short fiber: hydrophilic short fiber produced by the following method Vulcanization accelerator 1: di-2-benzothiazolyl disulfide (MBTS) Vulcanization accelerator 2: N-cyclohexyl-2-benzothiazolyl sulfonamide (CBS)

Foaming agent: dinitrosopentamethylene tetramine (DPT)

[Modified Polybutadiene Rubber 1]

(1) Preparation of Catalyst 7.11 g of a cyclohexane solution of butadiene (15.2% by mass), 0.59 mL of a cyclohexane solution of neodymium neodecanoate (0.56 M), 10.32 mL of a toluene solution of methyl aluminoxane MAO (manufactured by Tosoh Akzo Corporation, "PMAO") (3.23 M as aluminum concentration), and 7.77 mL of a hexane solution of diisobutyl aluminum hydride (manufactured by KANTO CHEMICAL CO., INC.) (0.90 M) were added in that order to a dried, nitrogen-purged, 100-mL glass bottle with a rubber stopper, and aged at room temperature for 2 minutes, and then 1.45 mL of a hexane solution of diethyl aluminum chloride (manufactured by KANTO CHEMICAL CO., INC.) (0.95 M) was added thereto and aged for 15 minutes at room temperature with intermittent stirring. The neodymium concentration in the thus-obtained catalyst solution was 0.011 M (mol/L).

(2) Production of Modified diene-Based Rubber with Modified Active Terminal

A glass bottle with a rubber stopper, having a volume of 900 mL, was dried and purged with nitrogen, and a cyclohexane solution of dried and purified butadiene and dry cyclohexane were separately put thereto to provide a state in which 400 g of a cyclohexane solution of 12.5% by mass butadiene was kept in the bottle. Next, 2.28 mL (0.025 mmol in terms of neodymium) of the solution of catalyst prepared above was added to the bottle, and polymerization was carried out in a hot water bath at 50° C. for 1.0 hour.

(3) First Modification

A hexane solution of 3-glycidoxypropyltrimethoxysilane (1.0 M) was added as a first modifying agent so that it is 23.5 (molar equivalents relative to neodymium) followed by a treatment at 50° C. for 60 minutes.

(4) Subsequent Treatment

Subsequently, 1.2 mL of sorbitan trioleate was singly added as carboxylic acid ester of polyhydric alcohol, and, after carrying out the modification reaction for 1 hour at 50° C., 2 mL of 5% isopropanol solution of an anti-aging agent 2,2'-methylene-bis(4-ethyl-6-t-butyl phenol) (NS-5) was added to terminate the reaction. Then, the re-precipitation was carried out in isopropanol containing a trace amount of NS-5, and then drying in a drum dryer was carried out to obtain a polybutadiene rubber with a modified active terminal (modified polybutadiene rubber 1). The obtained modified polybutadiene rubber 1 had a glass transition temperature of −110° C.

The bonded styrene amount of the conjugated diene compound moieties in the modified polybutadiene rubber 1 was obtained by an infrared method (Morello method), and it was found to be 0%.
[Modified Polybutadiene Rubber 2]
(1) Production of Non-Modified Polybutadiene 1.4 kg of cyclohexane, 250 g of 1,3-butadiene, and 2,2-ditetrahydrofurylpropane (0.285 mmol) were added to a 5 L, nitrogen-purged autoclave in the form of a cyclohexane solution in a nitrogen atmosphere. 2.85 mmol of n-butyl lithium (BuLi) was added thereto, and then polymerization was performed for 4.5 hours in a hot water bath at 50° C. equipped with a stirrer. The reaction conversion ratio of 1,3-butadiene was almost 100%. Part of the polymer solution was drawn into a methanol solution containing 1.3 g of 2,6-di-tert-butyl-p-cresol to terminate the polymerization, and then the solvent was removed by steam stripping, and the resultant was dried using a roll at 110° C. to give polybutadiene before modification.

(2) Production of Modified Polybutadiene Rubber 2

The polymer solution obtained in the above (1) was kept at a temperature of 50° C. without deactivation of the polymerization catalyst, and 1129 mg (3.364 mmol) of N, N-bis(trimethylsilyl) aminopropylmethyldiethoxysilane having a protected primary amino group was added thereto to perform the reaction of modification for 15 minutes.

Subsequently, 8.11 g of tetrakis(2-ethyl-1,3-hexanediolato) titanium which is a condensation accelerator was added thereto and the mixture was further stirred for 15 minutes.

Finally, 242 mg of silicon tetrachloride which is a metal halogen compound was added to the polymer solution after the reaction, and 2,6-di-tert-butyl-p-cresol was added thereto. The mixture was then subjected to steam stripping to remove the solvent and deprotect the protected primary amino group. The rubber was dried with a hot roll adjusted at 110° C. to obtain primary amine-modified polybutadiene (modified polybutadiene rubber 2). The bonded styrene amount of the conjugated diene compound moieties in the modified polybutadiene rubber 2 was obtained by an infrared method (Morello method), and it was found to be 0%.
[Styrene Butadiene Rubber]

A cyclohexane solution of 1,3-butadiene and a cyclohexane solution of styrene were added to a dried, nitrogen-purged, pressure-tight glass container having a volume of 800 mL, in such a manner that 1,3-butadiene is 67.5 g and styrene is 7.5 g. Then, 0.6 mmol of 2,2-ditetrahydrofurylpropane and 0.8 mmol of n-butyl lithium were added thereto, and the polymerization was performed at 50° C. for 1.5 hours. In this case, the polymerization conversion ratio was almost 100%. Thereafter, 2.0 mL of an isopropanol solution of 2,6-di-t-butyl-p-cresol (BHT) (BHT concentration: 5% by mass) was added to the polymerization system to terminate the reaction, and the resultant was dried by a common method to obtain styrene butadiene rubber. As a result, the bonded vinyl amount was 40% by mass and bonded styrene amount was 10% by mass.
[Modified Styrene Butadiene Rubber]

A cyclohexane solution of 1,3-butadiene and a cyclohexane solution of styrene were added to a dried, nitrogen-purged, pressure-tight glass container having a volume of 800 mL, in such a manner that 1,3-butadiene is 67.5 g and styrene is 7.5 g. Then, 0.6 mmol of 2,2-ditetrahydrofurylpropane and 0.8 mmol of n-butyl lithium were added thereto, and the polymerization was performed at 50° C. for 1.5 hours. 0.72 mmol of [N, N-bistrimethylsilyl]-(3-amino-1-propyl)](methyl) (dimethoxy)silane was added to the polymerization system in which the polymerization conversion ratio is almost 100% to perform the reaction of modification at 50° C. for 30 minutes. Thereafter, 2.0 mL of an isopropanol solution of 2,6-di-t-butyl-p-cresol (BHT) (BHT concentration: 5% by mass) was added to the polymerization system to terminate the reaction, and the resultant was dried by a common method to obtain modified styrene butadiene rubber. As a result, the bonded vinyl amount was 40% by mass and the bonded styrene amount was 10% by mass.
[Polymer]

Polymers 1, 3, and 6 were obtained as follows.

Furthermore, the bonded styrene amount of the conjugated diene compound moieties of Polymers 1, 3, and 6 (in the tables, described as "bonded styrene amount") and the bonded vinyl amount of the conjugated diene compound moieties (in the tables, described as "bonded vinyl amount") were obtained by an infrared method (Morello method). The results are shown in Table 1. Furthermore, the weight average molecular weight of Polymers 1, 3, and 6 in terms of polystyrene as measured by gel permeation chromatography (in the tables, described as "weight average molecular weight"), and the presence or absence of the use of a modifying agent are described in the following Table 1.

Furthermore, with regard to the presence or absence of the use of a modifying agent, "-" means that the polymer is a non-modified polymer which is polymerized without using a modifying agent. [0116]

Polymers 2, 4, 5, and 7 are obtained as follows.

Furthermore, the bonded styrene amount of the conjugated diene compound moieties of Polymers 2, 4, 5, and 7 (in the tables, described as "bonded styrene amount") and the bonded vinyl amount of the conjugated diene compound moieties (in the tables, described as "bonded vinyl amount") are obtained by an infrared method (Morello method). The results are shown in Table 1.

Furthermore, the weight average molecular weight of Polymers 2, 4, 5, and 7 in terms of polystyrene as measured by gel permeation chromatography (in the tables, described as "weight average molecular weight"), and the presence or absence of the use of a modifying agent are described in the following Table 1.

Furthermore, with regard to the presence or absence of the use of a modifying agent, "-" means that the polymer is a non-modified polymer which is polymerized without using a modifying agent.
(Polymer 1)

As Polymer 1, Ricon134 manufactured by CrayValley was used.

The micro structure (bonded vinyl amount, bonded styrene amount) and the weight average molecular weight (Mw) were measured for Polymer 1. As a result, it was found that the bonded vinyl amount is 24% by mass, bonded styrene amount is 0% by mass, and Mw is 15,000.
(Polymer 2)

Cyclohexane (300 g) and 1,3-butadiene (40 g) are added to a dried, nitrogen-purged, pressure-tight glass container having a volume of 800 mL, and then 0.59 mmol of n-butyl lithium (n-BuLi) is additionally added thereto. Thereafter, polymerization is performed at 50° C. for 1.5 hours. At that time, the polymerization conversion ratio is almost 100%. Thereafter, 0.5 mL of an isopropanol solution of 2,6-di-t-butyl-p-cresol (BHT) (BHT concentration: 5% by mass) is added thereto to terminate the polymerization, and the resultant is dried by a common method to obtain Polymer 2.

The micro structure (bonded vinyl amount, bonded styrene amount) and the weight average molecular weight (Mw) are measured for Polymer 2. As a result, it is found that the bonded vinyl amount is 25% by mass, bonded styrene amount is 0% by mass, and Mw is 25,000.
(Polymer 3)

As Polymer 3, Ricon142 manufactured by CrayValley was used.

The micro structure (bonded vinyl amount, bonded styrene amount) and the weight average molecular weight (Mw) were measured for Polymer 3. As a result, it was found that the bonded vinyl amount is 47% by mass, bonded styrene amount is 0% by mass, and Mw is 9,000.
(Polymer 4)

Cyclohexane (300 g),1,3-butadiene (40 g), and ditetrahydrofurylpropane (0.66 mmol) are added to a dried, nitrogen-purged, pressure-tight glass container having a volume of 800 mL, and then 1.02 mmol of n-butyl lithium (n-BuLi) is additionally added thereto. Thereafter, polymerization is performed at 50° C. for 1.5 hours. At that time, the polymerization conversion ratio is almost 100%. Thereafter, 0.5 mL of an isopropanol solution of 2,6-di-t-butyl-p-cresol (BHT) (BHT concentration: 5% by mass) is added thereto to terminate the polymerization, and the resultant is dried by a common method to obtain Polymer 4.

The micro structure (bonded vinyl amount, bonded styrene amount) and the weight average molecular weight (Mw) are measured for Polymer 4. As a result, it is found that the bonded vinyl amount is 50% by mass, bonded styrene amount is 0% by mass, and Mw is 15,000.
(Polymer 5)

Cyclohexane (300 g), 1,3-butadiene (40 g), and ditetrahydrofurylpropane (0.53 mmol) are added to a dried, nitrogen-purged, pressure-tight glass container having a volume of 800 mL, and then 0.59 mmol of n-butyl lithium (n-BuLi) is additionally added thereto. Thereafter, polymerization is performed at 50° C. for 1.5 hours. At that time, the polymerization conversion ratio is almost 100%. Thereafter, 0.5 mL of an isopropanol solution of 2,6-di-t-butyl-p-cresol (BHT) (BHT concentration: 5% by mass) is added thereto to terminate the polymerization, and the resultant is dried by a common method to obtain Polymer 5.

The micro structure (bonded vinyl amount, bonded styrene amount) and the weight average molecular weight (Mw) are measured for Polymer 5. As a result, it is found that the bonded vinyl amount is 47% by mass, bonded styrene amount is 0% by mass, and Mw is 25,000.
(Polymer 6)

As Polymer 6, LBR305 manufactured by Kuraray Co., Ltd. was used. The Micro structure (bonded vinyl amount, bonded styrene amount) and the weight average molecular weight (Mw) were measured for Polymer 6. As a result, it was found that the bonded vinyl amount is 8% by mass, bonded styrene amount is 0% by mass, and Mw is 26,000.

(Polymer 7)

Cyclohexane (300 g), 1,3-butadiene (40 g), and ditetrahydrofurylpropane (0.66 mmol) are added to a dried, nitrogen-purged, pressure-tight glass container having a volume of 800 mL, and then 0.35 mmol of n-butyl lithium (n-BuLi) is additionally added thereto. Thereafter, polymerization is performed at 50° C. for 1.5 hours. At that time, the polymerization conversion ratio is almost 100%. Thereafter, 0.5 mL of an isopropanol solution of 2,6-di-t-butyl-p-cresol (BHT) (BHT concentration: 5% by mass) is added thereto to terminate the polymerization, and the resultant is dried by a common method to obtain Polymer 7.

The micro structure (bonded vinyl amount, bonded styrene amount) and the weight average molecular weight (Mw) are measured for Polymer 7. As a result, it is found that the bonded vinyl amount is 50% by mass, bonded styrene amount is 0% by mass, and Mw is 45,000.

TABLE 1

|  |  | Polymer 1 | Polymer 2 | Polymer 3 | Polymer 4 |
|---|---|---|---|---|---|
| Bonded styrene amount | % | 0 | 0 | 0 | 0 |
| Bonded vinyl amount | % | 24 | 25 | 47 | 50 |
| Weight average molecular weight ($\times 10^3$) | — | 15 | 25 | 9 | 15 |
| Presence or absence of modifying agent | — | — | — | — | — |

|  |  | Polymer 5 | Polymer 6 | Polymer 7 |
|---|---|---|---|---|
| Bonded styrene amount | % | 0 | 0 | 0 |
| Bonded vinyl amount | % | 47 | 8 | 50 |
| Weight average molecular weight ($\times 10^3$) | — | 25 | 26 | 45 |
| Presence or absence of modifying agent | — | — | — | — |

Polymers 1 to 5 are a non-modified conjugated diene-based copolymer which has a weight average molecular weight of 5,000 or more but less than 40,000 in terms of polystyrene as measured by gel permeation chromatography and in which the bonded styrene amount of the conjugated diene compound moieties is less than 10% and the bonded vinyl amount of the conjugated diene compound moieties is 20% or more, as shown in Table 1 described above, and these polymers are the conjugated diene-based polymer (B) of the present invention.

[Hydrophilic Short Fiber]

According to Preparation Example 3 disclosed in JP 2012-219245 A, by using two twin-screw extruders, 40 parts by mass of polyethylene [Novatec HJ360 (with MFR 5.5 and melting point 132° C.) manufactured by Japan Polyethylene Corporation] and 40 parts by mass of an ethylene-vinyl alcohol copolymer [EVAL F104B (with MFR 4.4 and melting point 183° C.) manufactured by Kuraray Co., Ltd.] were charged into the hopper and separately and simultaneously extruded from a die exit, and the fiber obtained according to a common method was cut to a length of 2 mm. Accordingly, a hydrophilic short fiber formed with a coating layer, which is composed of polyethylene, was produced.

<Vulcanization of Rubber Composition and Evaluation of Vulcanized Rubber>

1. Storage Modulus (G') and Loss Tangent (tan δ)

Examples 1, 3, 6 to 10, and 13 and Comparative Examples 2, 4, and 6 to 8

According to vulcanization of the rubber composition for 33 minutes at 145° C., vulcanized rubber was obtained. The storage modulus (G') and the loss tangent (tan δ) were measured for the obtained vulcanized rubber by using a device for measuring viscoelasticity ARES (manufactured by TA Instruments, Inc) in the condition of a temperature of −20° C., a strain of 1%, and a frequency of 15 Hz. The results are shown in Table 2 to Table 6.

Examples 2, 4, 5, 11, and 12 and Comparative Examples 1, 3, and 5

According to vulcanization of the rubber composition for 33 minutes at 145° C., vulcanized rubber is obtained. The storage modulus (G') and the loss tangent (tan δ) are measured for the obtained vulcanized rubber by using a device for measuring viscoelasticity ARES (manufactured by TA Instruments, Inc) in the condition of a temperature of −20° C., a strain of 1%, and a frequency of 15 Hz. The results are shown in Table 2 to Table 6.

<Manufacture and Evaluation of Tire>

Examples 1, 3, 8, and 9 and Comparative Example 2

By using the rubber composition of the each Example and each Comparative Example in a tread, a test tire (tire size 195/65R15) was manufactured by a common method. The foaming ratio of a tread of the manufactured tire was calculated according to the above formula (1). Next, for the same tire, on-ice performance and abrasion resistance were evaluated according to the following method, and the overall evaluation was additionally obtained from the result of both of them. The results are shown in Table 2 to Table 6.

Examples 2, 4 to 7, and 10 to 13 and Comparative Examples 1 and 3 to 8

By using the rubber composition of the each Example and each Comparative Example in a tread, a test tire (tire size 195/65R15) is manufactured by a common method. The foaming ratio of a tread of the manufactured tire is calculated according to the above formula (1). Next, for the same tire, on-ice performance and abrasion resistance are evaluated according to the following method, and the overall evaluation is additionally obtained from the result of both of them. The results are shown in Table 2 to Table 6.

2. On-Ice Performance

Examples 1, 3, 8, and 9 and Comparative Example 2

Four testing tires of the each Example and each Comparative Example were mounted on a domestic passenger car with a class of 1600 cc displacement to evaluate the on-ice braking performance at an ice temperature of −1° C. Using the test tire of Comparative Example 4 as a control, the index values are expressed in which On-ice performance=(Braking distance of test tire of Comparative Example 4/Braking distance of test tire other than Comparative Example 4)×100. Larger index values represent better on-ice performance.

Examples 2, 4 to 7, and 10 to 13 and Comparative Examples 1 and 3 to 8

Four testing tires of the each Example and each Comparative Example are mounted on a domestic passenger car with a class of 1600 cc displacement to evaluate the on-ice braking performance at an ice temperature of −1° C. Using the test tire of Comparative Example 4 as a control, the index values are expressed in which On-ice performance=(Braking distance of test tire of Comparative Example 4/braking distance of test tire other than Comparative Example 4)×100. Larger index values represent better on-ice performance.

3. Abrasion Resistance

Examples 1, 3, 8, and 9 and Comparative Example 2

After driving 10,000 km on a paved surface with an actual vehicle by using the test tires of the each Example and each Comparative Example, the remaining tread grooves were measured. Relative comparison of the driving distance that is required for wearing 1 mm of the tread was made, and, by having a value of 100 for the test tire of Comparative Example 4, the results were shown in terms of an index value. Larger index values represent better abrasion resistance.

Examples 2, 4 to 7, and 10 to 13 and Comparative Examples 1 and 3 to 8

After driving 10,000 km on a paved surface with an actual vehicle by using the test tires of the each Example and each Comparative Example, the remaining tread grooves are measured. Relative comparison of the driving distance that is required for wearing 1 mm of the tread is made, and, by having a value of 100 for the test tire of Comparative Example 4, the results are shown in terms of an index value. Larger index values represent better abrasion resistance.

4. Overall Evaluation (Balance Between On-Ice Performance and Abrasion Resistance)

Examples 1, 3, 8, and 9 and Comparative Example 2

From the result of evaluating on-ice performance and result of evaluating abrasion resistance, a balance between on-ice performance and abrasion resistance of the test tires of the each Example and each Comparative Example was evaluated as a value obtained from (Index value of on-ice performance+Index value of abrasion resistance)/2. Larger values represent greater breakage of the contradiction between on-ice performance and water resistance. A value of 103 or higher from the overall evaluation indicates that both excellent on-ice performance and excellent abrasion resistance are obtained.

Examples 2, 4 to 7, and 10 to 13 and Comparative Examples 1 and 3 to 8

From the result of evaluating on-ice performance and result of evaluating abrasion resistance, a balance between on-ice performance and abrasion resistance of the test tires of the each Example and each Comparative Example is evaluated as a value obtained from (Index value of on-ice performance+Index value of abrasion resistance)/2. Larger values represent greater breakage of the contradiction between on-ice performance and water resistance. A value of 103 or higher from the overall evaluation indicates that both excellent on-ice performance and excellent abrasion resistance are obtained.

TABLE 2

|  |  |  |  | Example 1 | Example 2 | Example 3 | Example 4 | Example 5 |
|---|---|---|---|---|---|---|---|---|
| Mixing | First mixing step | Natural rubber | Parts by mass | 50 | 50 | 50 | 50 | 50 |
|  |  | Modified polybutadiene rubber 1 |  | 50 | 50 | 50 | 50 | 50 |
|  |  | Carbon black |  | 35 | 35 | 35 | 35 | 35 |
|  |  | Silica |  | 35 | 35 | 35 | 35 | 35 |
|  |  | Silane coupling agent |  | 4 | 4 | 4 | 4 | 4 |
|  |  | Polymer 1 |  | 20 | — | — | — | — |
|  |  | Polymer 2 |  | — | 20 | — | — | — |
|  |  | Polymer 3 |  | — | — | 20 | — | — |
|  |  | Polymer 4 |  | — | — | — | 20 | — |
|  |  | Polymer 5 |  | — | — | — | — | 20 |
|  |  | Resin |  | 20 | 20 | 20 | 20 | 20 |
|  |  | Stearic acid |  | 2 | 2 | 2 | 2 | 2 |
|  |  | Zinc oxide |  | 2 | 2 | 2 | 2 | 2 |
|  |  | Wax |  | 2 | 2 | 2 | 2 | 2 |
|  |  | Anti-aging agent |  | 2 | 2 | 2 | 2 | 2 |
|  | Final mixing step | Sulfur |  | 2 | 2 | 2 | 2 | 2 |
|  |  | Vulcanization accelerator 1 |  | 1 | 1 | 1 | 1 | 1 |
|  |  | Vulcanization accelerator 2 |  | 1 | 1 | 1 | 1 | 1 |
|  |  | Hydrophilic short fiber |  | 2 | 2 | 2 | 2 | 2 |
|  |  | Foaming agent |  | 4 | 4 | 4 | 4 | 4 |
| Physical properties |  | Foaming ratio | % | 20 | 20 | 20 | 20 | 20 |
|  |  | Storage modulus at −20° C. | Index value | 96 | 99 | 99 | 104 | 110 |
|  |  | Loss coefficient (tanδ) at −20° C. | Index value | 105 | 109 | 111 | 111 | 110 |
| Evaluation |  | On-ice performance | Index value | 104 | 105 | 107 | 107 | 105 |
|  |  | Abrasion resistance | Index value | 106 | 106 | 105 | 105 | 106 |
|  |  | Balance between on-ice performance and abrasion resistance | Index value | 105 | 106 | 106 | 106 | 106 |

TABLE 3

|  |  |  |  | Example 6 | Example 7 | Example 8 | Example 9 | Example 10 |
|---|---|---|---|---|---|---|---|---|
| Mixing | First mixing step | Natural rubber | Parts by mass | 45 | 60 | 60 | 60 | 60 |
|  |  | Polybutadiene rubber |  | — | — | — | — | 20 |
|  |  | Modified polybutadiene rubber 1 |  | 55 | 40 | — | — | — |
|  |  | Modified polybutadiene rubber 2 |  | — | — | 20 | 20 | — |
|  |  | Modified styrene polybutadiene rubber |  | — | — | 20 | 20 | 20 |
|  |  | Carbon black |  | 35 | 35 | 35 | 35 | 35 |
|  |  | Silica |  | 35 | 35 | 35 | 35 | 35 |
|  |  | Silane coupling agent |  | 4 | 4 | 4 | 4 | 4 |
|  |  | Polymer 1 |  | 20 | 20 | 20 | — | — |
|  |  | Polymer 3 |  | — | — | — | 20 | 20 |
|  |  | Resin |  | 20 | 20 | 20 | 20 | 20 |
|  |  | Stearic acid |  | 2 | 2 | 2 | 2 | 2 |
|  |  | Zinc oxide |  | 2 | 2 | 2 | 2 | 2 |
|  |  | Wax |  | 2 | 2 | 2 | 2 | 2 |
|  |  | Anti-aging agent |  | 2 | 2 | 2 | 2 | 2 |
|  | Final mixing step | Sulfur |  | 2 | 2 | 2 | 2 | 2 |
|  |  | Vulcanization accelerator 1 |  | 1 | 1 | 1 | 1 | 1 |
|  |  | Vulcanization accelerator 2 |  | 1 | 1 | 1 | 1 | 1 |
|  |  | Hydrophilic short fiber |  | 2 | 2 | 2 | 2 | 2 |
|  |  | Foaming agent |  | 4 | 4 | 4 | 4 | 4 |
| Physical properties |  | Foaming ratio | % | 20 | 20 | 20 | 20 | 20 |
|  |  | Storage modulus at −20° C. | Index value | 95 | 102 | 101 | 103 | 109 |
|  |  | Loss coefficient (tanδ) at −20° C. | Index value | 104 | 108 | 118 | 120 | 115 |
| Evaluation |  | On-ice performance | Index value | 104 | 105 | 113 | 115 | 111 |
|  |  | Abrasion resistance | Index value | 106 | 105 | 99 | 98 | 95 |
|  |  | Balance between on-ice performance and abrasion resistance | Index value | 105 | 105 | 106 | 107 | 103 |

TABLE 4

|  |  |  |  | Example 11 | Example 12 | Example 13 | Comparative Example 1 | Comparative Example 2 | Comparative Example 3 |
|---|---|---|---|---|---|---|---|---|---|
| Mixing | First mixing step | Natural rubber | Parts by mass | 50 | 50 | 50 | 50 | 50 | 50 |
|  |  | Polybutadiene rubber |  | — | — | — | 50 | — | — |
|  |  | Modified polybutadiene rubber 1 |  | 50 | 50 | 50 | — | 50 | 50 |
|  |  | Carbon black |  | 35 | 35 | 35 | 35 | 35 | 35 |
|  |  | Silica |  | 35 | 35 | 35 | 35 | 35 | 35 |

TABLE 4-continued

|  |  |  |  | Example 11 | Example 12 | Example 13 | Comparative Example 1 | Comparative Example 2 | Comparative Example 3 |
|---|---|---|---|---|---|---|---|---|---|
|  |  | Silane coupling agent |  | 4 | 4 | 4 | 4 | 4 | 4 |
|  |  | Process oil |  | — | — | 10 | 20 | 20 | 30 |
|  |  | Polymer 3 |  | — | — | 10 | — | — | — |
|  |  | Polymer 4 |  | 20 | 20 | — | — | — | — |
|  |  | Resin |  | 20 | 20 | 20 | 20 | 20 | 20 |
|  |  | Stearic acid |  | 2 | 2 | 2 | 2 | 2 | 2 |
|  |  | Zinc oxide |  | 2 | 2 | 2 | 2 | 2 | 2 |
|  |  | Wax |  | 2 | 2 | 2 | 2 | 2 | 2 |
|  |  | Anti-aging agent |  | 2 | 2 | 2 | 2 | 2 | 2 |
|  | Final | Sulfur |  | 2 | 2 | 2 | 2 | 2 | 2 |
|  | mixing | Vulcanization accelerator 1 |  | 1 | 1 | 1 | 1 | 1 | 1 |
|  | step | Vulcanization accelerator 2 |  | 1 | 1 | 1 | 1 | 1 | 1 |
|  |  | Hydrophilic short fiber |  | 2 | 2 | 2 | 2 | 2 | 2 |
|  |  | Foaming agent |  | 2.5 | 5 | 4 | 4 | 4 | 4 |
| Physical | Foaming ratio | % |  | 10 | 30 | 20 | 20 | 20 | 20 |
| properties | Storage modulus at −20° C. | Index value |  | 110 | 98 | 96 | 101 | 97 | 92 |
|  | Loss coefficient (tanδ) at −20° C. | Index value |  | 111 | 111 | 106 | 97 | 97 | 99 |
| Evaluation | On-ice performance | Index value |  | 101 | 118 | 105 | 93 | 97 | 99 |
|  | Abrasion resistance | Index value |  | 110 | 97 | 102 | 95 | 99 | 93 |
|  | Balance between on-ice performance and abrasion resistance | Index value |  | 106 | 108 | 104 | 94 | 99 | 97 |

TABLE 5

|  |  |  |  | Comparative Example 4 | Comparative Example 5 |
|---|---|---|---|---|---|
| Mixing | First mixing step | Natural rubber | Parts by mass | 50 | 50 |
|  |  | Modified polybutadiene rubber 1 |  | 50 | 50 |
|  |  | Carbon black |  | 35 | 35 |
|  |  | Silica |  | 35 | 35 |
|  |  | Silane coupling agent |  | 4 | 4 |
|  |  | Polymer 6 |  | 20 | — |
|  |  | Polymer 7 |  | — | 20 |
|  |  | Resin |  | 20 | 20 |
|  |  | Stearic acid |  | 2 | 2 |
|  |  | Zinc oxide |  | 2 | 2 |
|  |  | Wax |  | 2 | 2 |
|  |  | Anti-aging agent |  | 2 | 2 |
|  | Final mixing step | Sulfur |  | 2 | 2 |
|  |  | Vulcanization accelerator 1 |  | 1 | 1 |
|  |  | Vulcanization accelerator 2 |  | 1 | 1 |
|  |  | Hydrophilic short fiber |  | 2 | 2 |
|  |  | Foaming agent |  | 4 | 4 |
| Physical properties | Foaming ratio | % |  | 20 | 20 |
|  | Storage modulus at −20° C. | Index value |  | 106 | 115 |
|  | Loss coefficient (tanδ) at −20° C. | Index value |  | 100 | 96 |
| Evaluation | On-ice performance | Index value |  | 100 | 89 |
|  | Abrasion resistance | Index value |  | 100 | 102 |
|  | Balance between on-ice performance and abrasion resistance | Index value |  | 100 | 96 |

TABLE 6

|  |  |  |  | Comparative Example 6 | Comparative Example 7 | Comparative Example 8 |
|---|---|---|---|---|---|---|
| Mixing | First mixing step | Natural rubber | Parts by mass | 60 | 60 | 40 |
|  |  | Polybutadiene rubber |  | 20 | 20 | — |
|  |  | Modified polybutadiene rubber 1 |  | — | — | 60 |
|  |  | Styrene butadiene rubber |  | 20 | 20 | — |
|  |  | Carbon black |  | 35 | 35 | 35 |
|  |  | Silica |  | 35 | 35 | 35 |
|  |  | Silane coupling agent |  | 4 | 4 | 4 |
|  |  | Polymer 1 |  | 20 | — | 20 |
|  |  | Polymer 3 |  | — | 20 | — |
|  |  | Resin |  | 20 | 20 | 20 |
|  |  | Stearic acid |  | 2 | 2 | 2 |
|  |  | Zinc oxide |  | 2 | 2 | 2 |
|  |  | Wax |  | 2 | 2 | 2 |
|  |  | Anti-aging agent |  | 2 | 2 | 2 |

TABLE 6-continued

|  |  |  | Comparative Example 6 | Comparative Example 7 | Comparative Example 8 |
|---|---|---|---|---|---|
| Final mixing step | Sulfur |  | 2 | 2 | 2 |
|  | Vulcanization accelerator 1 |  | 1 | 1 | 1 |
|  | Vulcanization accelerator 2 |  | 1 | 1 | 1 |
|  | Hydrophilic short fiber |  | 2 | 2 | 2 |
|  | Foaming agent |  | 4 | 4 | 4 |
| Physical properties | Foaming ratio | % | 20 | 20 | 20 |
|  | Storage modulus at −20° C. | Index value | 122 | 123 | 96 |
|  | Loss coefficient (tanδ) at −20° C. | Index value | 101 | 102 | 102 |
| Evaluation | On-ice performance | Index value | 99 | 100 | 98 |
|  | Abrasion resistance | Index value | 87 | 86 | 105 |
|  | Balance between on-ice performance and abrasion resistance | Index value | 93 | 93 | 102 |

From the results of Examples that are shown in Table 2 to Table 6, it is acknowledged that, by using the rubber composition according to the present invention, a tire can have excellent on-ice performance and also a good balance between on-ice performance and abrasion resistance.

INDUSTRIAL APPLICABILITY

The rubber composition of the present invention can be used as a tread rubber of a tire, in particular, a studless tire. Furthermore, the tire of the present invention is useful as a studless tire.

The invention claimed is:

1. A rubber composition comprising:
   100 parts by mass of a rubber component (A) containing 45 to 75% by mass of natural rubber and 25 to 55% by mass of a conjugated diene-based polymer, in which a bonded styrene amount of conjugated diene compound moieties is 25% or less;
   1 to 40 parts by mass of a non-modified conjugated diene-based polymer (B) which has a weight average molecular weight of 5,000 or more but less than 40,000 in terms of polystyrene as measured by gel permeation chromatography and in which a bonded styrene amount of conjugated diene compound moieties is less than 10% and a bonded vinyl amount of conjugated diene compound moieties is 45% or more but 55% or less; and
   a filler (C),
   wherein at least one of the conjugated diene-based polymers contained in the rubber component (A) is a modified conjugated diene-based polymer.

2. The rubber composition according to claim 1, wherein the conjugated diene-based polymer (B) is polybutadiene.

3. The rubber composition according to claim 1, wherein the conjugated diene-based polymer contained in the rubber component (A) contains polybutadiene rubber and styrene butadiene rubber.

4. The rubber composition according to claim 1, wherein the rubber composition comprises a foaming agent.

5. The rubber composition according to claim 1, wherein the rubber composition comprises a hydrophilic short fiber.

6. The rubber composition according to claim 2, wherein the conjugated diene-based polymer contained in the rubber component (A) contains polybutadiene rubber and styrene butadiene rubber.

7. The rubber composition according to claim 2, wherein the rubber composition comprises a foaming agent.

8. The rubber composition according to claim 3, wherein the rubber composition comprises a foaming agent.

9. The rubber composition according to claim 2, wherein the rubber composition comprises a hydrophilic short fiber.

10. The rubber composition according to claim 3, wherein the rubber composition comprises a hydrophilic short fiber.

11. The rubber composition according to claim 4, wherein the rubber composition comprises a hydrophilic short fiber.

12. A pneumatic tire having a tread portion formed from the rubber composition according to claim 1.

\* \* \* \* \*